US009712861B1

(12) United States Patent
Milne et al.

(10) Patent No.: US 9,712,861 B1
(45) Date of Patent: Jul. 18, 2017

(54) INTERACTIVE LOAD BALANCING AMONG DVRS BASED ON CUSTOMER SELECTION

(71) Applicant: SONY CORPORATION, Tokyo (JP)

(72) Inventors: James R. Milne, Ramona, CA (US); Fred Ansfield, San Diego, CA (US); Frederick J. Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/066,470

(22) Filed: Mar. 10, 2016

(51) Int. Cl.
H04N 21/2747 (2011.01)
H04N 21/4147 (2011.01)
H04N 21/231 (2011.01)
H04N 21/433 (2011.01)
H04N 21/426 (2011.01)
H04N 21/438 (2011.01)
H04N 21/60 (2011.01)

(52) U.S. Cl.
CPC ... H04N 21/4147 (2013.01); H04N 21/23103 (2013.01); H04N 21/23113 (2013.01); H04N 21/42623 (2013.01); H04N 21/4334 (2013.01); H04N 21/4382 (2013.01); H04N 21/60 (2013.01)

(58) Field of Classification Search
None
See application file for complete search history.

(56) References Cited

U.S. PATENT DOCUMENTS

| 5,883,621 | A | 3/1999 | Iwamura |
| 8,214,422 | B1 | 7/2012 | Woodward et al. |
| 8,745,685 | B2 | 6/2014 | Josephs et al. |
| 8,931,010 | B2 | 1/2015 | Putterman et al. |
| 9,326,016 | B2 | 4/2016 | Grasset |
| 2002/0040475 | A1 | 4/2002 | Yap et al. |
| 2002/0174430 | A1 | 11/2002 | Ellis et al. |
| 2003/0095791 | A1 | 5/2003 | Barton et al. |
| 2003/0149988 | A1 | 8/2003 | Ellis et al. |
| 2003/0204856 | A1 | 10/2003 | Buxton |
| 2004/0181800 | A1 | 9/2004 | Rakib et al. |
| 2005/0028208 | A1 | 2/2005 | Ellis et al. |
| 2005/0050578 | A1 | 3/2005 | Ryal |

(Continued)

FOREIGN PATENT DOCUMENTS

WO 2012087721 A1 6/2012

OTHER PUBLICATIONS

James R. Milne, Fred Ansfield, Frederick J. Zustak, "Automatic MSO-Based Transfer of DVR Content to New Location of Customer", related U.S. Appl. No. 15/066,555, Applicant's response to Non-Final Office Action filed Nov. 14, 2016.

(Continued)

Primary Examiner — Pankaj Kumar
Assistant Examiner — Charles N Hicks
(74) Attorney, Agent, or Firm — John L. Rogitz

(57) ABSTRACT

A technique for load balancing between first and second DVRs includes receiving a customer selection of content with respect to load balancing between the DVRs, and responsive to the customer selection and based at least in part on a storage size of one content, execute a load balancing algorithm to move at least some content from the first DVR to the second DVR. Responsive to the customer selection and based at least in part on a storage size of a future content, a DVR is selected to record the future content at a future recording time.

20 Claims, 24 Drawing Sheets

(56) References Cited

U.S. PATENT DOCUMENTS

| | | |
|---|---|---|
| 2006/0128328 A1 | 6/2006 | Shah |
| 2007/0024706 A1 | 2/2007 | Brannon et al. |
| 2007/0058924 A1 | 3/2007 | Yeh |
| 2007/0078910 A1 | 4/2007 | Bopardikar |
| 2007/0157281 A1 | 7/2007 | Ellis et al. |
| 2008/0002951 A1 | 1/2008 | Russ et al. |
| 2008/0005030 A1 | 1/2008 | Schlarb et al. |
| 2008/0005204 A1 | 1/2008 | Prus et al. |
| 2008/0066112 A1 | 3/2008 | Bailey et al. |
| 2008/0104202 A1 | 5/2008 | Barrett et al. |
| 2008/0120675 A1 | 5/2008 | Morad et al. |
| 2008/0134258 A1 | 6/2008 | Goose et al. |
| 2008/0155615 A1 | 6/2008 | Craner et al. |
| 2008/0163059 A1 | 7/2008 | Craner |
| 2008/0235731 A1 | 9/2008 | Bryant et al. |
| 2008/0282312 A1 | 11/2008 | Blinnikka |
| 2009/0010610 A1 | 1/2009 | Scholl et al. |
| 2009/0028529 A1 | 1/2009 | Kuhns |
| 2009/0100478 A1 | 4/2009 | Craner et al. |
| 2009/0207817 A1 | 8/2009 | Montemurro et al. |
| 2009/0254966 A1 | 10/2009 | Josephs et al. |
| 2010/0153885 A1 | 6/2010 | Yates |
| 2010/0174599 A1 | 7/2010 | Rosenblatt et al. |
| 2010/0235386 A1 | 9/2010 | Zhao et al. |
| 2011/0030024 A1 | 2/2011 | Pasko et al. |
| 2011/0078717 A1 | 3/2011 | Drummond et al. |
| 2011/0135271 A1 | 6/2011 | Hoff et al. |
| 2011/0219229 A1 | 9/2011 | Cholas et al. |
| 2011/0289526 A1 | 11/2011 | Poole et al. |
| 2012/0131125 A1 | 5/2012 | Seidel et al. |
| 2012/0140122 A1 | 6/2012 | Lai |
| 2012/0155836 A1 | 6/2012 | Brouda et al. |
| 2012/0210382 A1* | 8/2012 | Walker .............. G06F 17/30017 725/115 |
| 2013/0007830 A1 | 1/2013 | Klappert et al. |
| 2013/0055312 A1* | 2/2013 | Cheng ................ H04N 21/4325 725/49 |
| 2013/0113421 A1 | 5/2013 | Han et al. |
| 2013/0142499 A1 | 6/2013 | Major et al. |
| 2014/0184171 A1 | 7/2014 | Lee et al. |
| 2014/0186001 A1 | 7/2014 | Aldrey et al. |
| 2014/0268224 A1 | 9/2014 | Inoue |
| 2014/0270713 A1 | 9/2014 | Hybertson |
| 2015/0003814 A1 | 1/2015 | Miller |
| 2015/0010292 A1 | 1/2015 | Kottikulam et al. |
| 2015/0067099 A1 | 3/2015 | Martin |
| 2015/0074818 A1 | 3/2015 | Watson et al. |
| 2015/0172748 A1 | 6/2015 | Navarro |
| 2015/0229997 A1 | 8/2015 | Park et al. |
| 2016/0066031 A1 | 3/2016 | Vaidhyanathan et al. |
| 2016/0105400 A1 | 4/2016 | Straub |
| 2016/0127773 A1 | 5/2016 | Kang |
| 2017/0055274 A1 | 2/2017 | Tanji |

OTHER PUBLICATIONS

"How to use the Season Pass manager on tivo.com", 2016, TiVO. com, retrieved from https://www.tivo.com/support/how-to/how-use-season-pass-manager-tivocom.

James R. Milne, Fred Ansfield, Frederick J. Zustak, "MSO-Centric DVR-to-DVR Transfer of Customer-Selected Content", file history related U.S. Appl. No. 15/066,116, filed Mar. 10, 2016.

James R. Milne, Fred Ansfield, Frederick J. Zustak, "Internet-Centric DVR Transfer of Customer-Selected Content", file history of related U.S. Appl. No. 15/066,166, filed Mar. 10, 2016.

James R. Milne, Fred Ansfield, Frederick J. Zustak, "Dynamic Load Balancing Among DVRs of Already-Recorded Content", file history of related U.S. Appl. No. 15/056,293, filed Mar. 10, 2016.

James R. Milne, Fred Ansfield, Frederick J. Zustak, "Autonomous Load Balancing Among DVRs of New and Future Content", file history of related U.S. Appl. No. 15/066,373, filed Mar. 10, 2016.

James R. Milne, Fred Ansfield, Frederick J. Zustak, "Automatic MSO-Based Transfer of DVR Content to New Location of Customer", file history of related U.S. Appl. No. 15/066,723, filed Mar. 10, 2016.

James R. Milne, Fred Ansfield, Frederick J. Zustak, "DVR Content Backup Using Another DVR or Another HDD on the Same DVR", file history of related U.S. Appl. No. 15/066,723, filed Mar. 10, 2016.

James R. Milne, Fred Ansfield, Frederick J. Zustak, "DVR Community Network for Quick Access to Shared Content", file history of related U.S. Appl. No. 15/066,792, filed Mar. 10, 2016.

James R. Milne, Fred Ansfield, Frederick J. Zustak, "Automatic MSO-Based Transfer of DVR Content to New Location of Customer", related U.S. Appl. No. 15/066,555, Non-Final Office Action dated Nov. 14, 2016.

James R. Milne, Fred Ansfield, Frederick J. Zustak, "Autonomous Load Balancing Among DVRs of New and Future Content", related U.S. Appl. No. 15/066,373, Non-Final Office Action dated Dec. 2, 2016.

James R. Milne, Fred Ansfield, Frederick J. Zustak, "Autonomous Load Balancing Among DVRs of New and Future Content", related U.S. Appl. No. 15/066,373, Applicant's response to Non-Final Office Action filed Dec. 9, 2016.

James R. Milne, Fred Ansfield, Frederick J. Zustak, "Autonomous Load Balancing Among DVRs of New and Future Content", related U.S. Appl. No. 15/066,373, Final Office Action dated Apr. 3, 2017.

James R. Milne, Fred Ansfield, Frederick J. Zustak, "Autonomous Load Balancing Among DVRs of New and Future Content", related U.S. Appl. No. 15/066,373, Applicant's response to Final Office Action filed Apr. 5, 2017.

James R. Milne, Fred Ansfield, Frederick J. Zustak, "Dynamic Load Balancing Among DVRs of Already-Recorded Content", related U.S. Appl. No. 15/066,293, Final Office Action dated Apr. 12, 2017.

James R. Milne, Fred Ansfield, Frederick J. Zustak, "DVR Community Network for Quick Access to Shared Content", related U.S. Appl. No. 15/066,792, Applicant's response to Non-Final Office Action filed Mar. 13, 2017.

James R. Milne, Fred Ansfield, Frederick J. Zustak, "Dynamic Load Balancing Among DVRs of Already-Recorded Content", related U.S. Appl. No. 15/066,293, Non-Final Office Action dated Mar. 16, 2017.)

James R. Milne, Fred Ansfield, Frederick J. Zustak, "Automatic MSO-Based Transfer of DVR Content to New Location of Customer", related pending U.S. Appl. No. 15/066,555, final office action dated Feb. 8, 2017.

James R. Milne, Fred Ansfield, Frederick J. Zustak, "Automatic MSO-Based Transfer of DVR Content to New Location of Customer", related U.S. Appl. No. 15/066,555, Applicant's response to Final Office Action filed Mar. 7, 2017.

James R. Milne, Fred Ansfield, Frederick J. Zustak, "DVR Community Network for Quick Access to Shared Content", related U.S. Appl. No. 15/066,792, Non-Final Office Action dated Mar. 6, 2017.

James R. Milne, Fred Ansfield, Frederick J. Zustak, "Dynamic Load Balancing Among DVRs of Already-Recorded Content", related U.S. Appl. No. 15/066,293, Applicant's response to Non-Final Office Action filed Mar. 20, 2017.

James R. Milne, Fred Ansfield, Frederick J. Zustak, "Internet-Centric DVR to DVR Transfer of Customer-Selected Content", related U.S. Appl. No. 15/066,166, Final Office Action dated Mar. 27, 2017.

James R. Milne, Fred Ansfield, Frederick J. Zustak, "Internet-Centric DVR to DVR Transfer of Customer-Selected Content", related U.S. Appl. No. 15/066,166, Applicant's response to Final Office Action filed Mar. 28, 2017.

James R. Milne, Fred Ansfield, Frederick J. Zustak, "Internet-Centric DVR to DVR Transfer of Customer-Selected Content", related U.S. Appl. No. 15/066,166, Non-Final Office Action dated Feb. 10, 2017.

James R. Milne, Fred Ansfield, Frederick J. Zustak, "Internet-Centric DVR to DVR Transfer of Customer-Selected Content", related U.S. Appl. No. 15/066,166, Applicant's response to Non-Final Office Action filed Feb. 14, 2017.

(56) References Cited

OTHER PUBLICATIONS

James R. Milne, Fred Ansfield, Frederick J. Zustak, "Automatic MSO-Based Transfer of DVR Content to New Location of Customer", related U.S. Appl. No. 15/066,555, Non-Final Office Action dated Apr. 21, 2017.

\* cited by examiner

US 9,712,861 B1

INTERACTIVE LOAD BALANCING AMONG DVRS BASED ON CUSTOMER SELECTION

FIELD

The application relates generally to content management pertaining to digital video recorders (DVR).

BACKGROUND

Digital video recorders (DVR) have become ubiquitous and integral components of home networks, which are examples of digital ecosystems. Technologies such as universal plug-n-play (UPnP) and digital living network alliance (DLNA) allow for audiovisual content to be served, discovered and played back over the home network using DVRs. Present principles relate to enhanced techniques for DVR operation.

SUMMARY

Accordingly, an apparatus includes at least one computer memory that is not a transitory signal and that in turn includes instructions executable by at least one processor to receive a customer selection of content with respect to load balancing between at least first and second digital video recorders (DVRs). Responsive to the customer selection and based at least in part on a storage size of at least one content, the instructions are executable to execute a load balancing algorithm to move at least some content from the first DVR to the second DVR. Furthermore, responsive to the customer selection and based at least in part on a storage size of at least one future content, the instructions are executable to select a DVR to record the at least one future content at a future recording time.

In some implementations, the content may include video received on at least one video input of the first DVR and stored in the first DVR in decrypted form prior to decoding. The content can include two or more of: recorded programs, season passes, customer preferences.

The customer selection may exempt at least one content from load balancing. In addition or alternatively, a customer selection can require at least one content to be subject to load balancing.

In non-limiting examples, the load balancing algorithm may use available storage space on the DVRs. In addition or alternatively, the load balancing algorithm may use how much space is needed for upcoming events. In addition or alternatively, the load balancing algorithm may use workload of at least one of the DVRs.

In another aspect, an apparatus includes at least one computer memory that is not a transitory signal and that in turn includes instructions executable by at least one processor to present on at least one display a user interface (UI) that includes a load balancing selector selectable to implement load balancing of content between at least first and second digital video recorders (DVRs). The UI also includes an all selector selectable to command that all content on the DVRs be balanced as part of a load balancing algorithm, and a content selector selectable to exempt at least one content from the load balancing, or to impose the load balancing on the at least one contest.

In another aspect, a method includes receiving at least one customer selection of content, and based at least in part on the customer selection, executing a load balancing algorithm to move content from a first digital video recorder (DVR) to a second DVR.

The details of the present application, both as to its structure and operation, can best be understood in reference to the accompanying drawings, in which like reference numerals refer to like parts, and in which:

DETAILED DESCRIPTION

Figure 1:
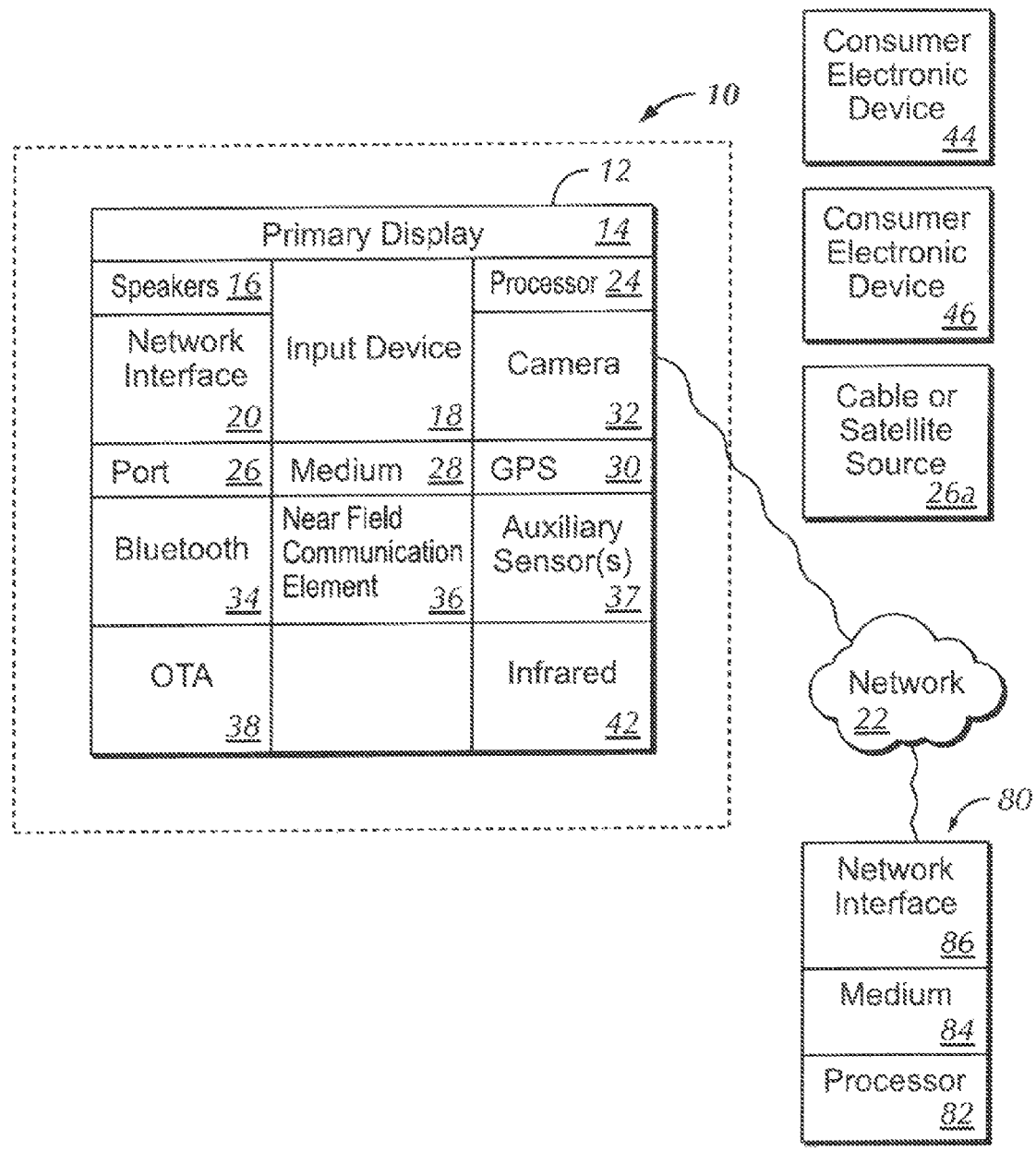
FIG. 1 is a block diagram of an example system including an example in accordance with present principles.

This disclosure relates generally to computer ecosystems and in particular to home networks having one or more digital video recorders (DVR) along with various other consumer electronics (CE) devices. Generally, a DVR generally is a device that stores received audio video signals that are typically broadcast, e.g., from a satellite or a cable head end, on one or more storage media such as hard disk drives (HDD), universal serial bus (USB) flash drives, secure digital (SD) memory cards, optical disk drives, and solid state drives (SSD). In the case of digital television, there is no encoder or decoder provided in the DVR since the signal is already a digitally encoded moving pictures experts group (MPEG) stream. The DVR simply stores the digital stream directly to disk. With more particularity, a satellite or cable set-top box (which may include an integral DVR or be connected to an external DVR) both decrypts the signal if encrypted, and decodes the stream into an analog signal for viewing on the television. For recording, however, cable or satellite digital signals are decrypted but not decoded prior to recording. Thus, a DVR typically stores decrypted broadcast audio video signals that have not yet been decoded. It is to be understood that Note that advanced video coding (AVC) content and high efficiency video coding (HEVC) may be used as well as MPEG.

To this end, in addition to the further description below, a DVR typically includes one or more video inputs with connector types consistent with received video format, e.g., coaxial cable, twisted pair or optical fiber cable. A DVR may also include a looping video output for each input, which duplicates the corresponding input video signal and connector type for use of the duplicated signal by other video equipment.

A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members. Home networks herein, as non-limiting examples, employ one or more of (potentially overlapping) DLNA technology, wireless networks, Ethernet networks, fiber optic networks, Wi-Fi networks, UPnP networks, high definition multimedia interface (HDMI) links, remote view (RVU) networks such as provided by DirectTV, etc.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented hardware software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example device included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV) that may include one or more of the digital video recorders discussed herein. However, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/ microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) interface or a USB port to physically connect (e.g. using a wired connection) to another CE device and/or a headphone port to connect headphones to the AVDD 12 for presentation of audio from the AVDD 12 to a user through the headphones. For example, the input interface 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid state storage that are not transitory signals, in some cases embodied in the chassis of the AVDD as standalone devices or as a personal video recording device (PVR) or video disk player either internal or external to the chassis of the AVDD for playing back AV programs or as removable memory media as described further below. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. When the system 10 is a home network, communication between components may be according to the digital living network alliance (DLNA) protocol.

In one example, a first CE device 44 may include some or all of the following components, and a second CE device 46 may include similar components as the first CE device 44 and hence will not be discussed in detail. In the example shown, only two CE devices 44, 46 are shown, it being understood that fewer or greater devices may be used. In an example, the CE devices 44, 46 may be implemented by first and second DVRs and one or both may be internal to the AVDD 12 as alluded to above or external to the AVDD 12 as shown for illustration.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/ microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input interfaces 60 such as, e.g., a HDMI interface or a USB port to physically connect (e.g.

using a wired connection) to another CE device and/or a headphone port to connect headphones to the first CE device 44 for presentation of audio from the first CE device 44 to a user through the headphones. The first CE device 44 may further include one or more computer memories 62 such as disk-based or solid state storage (in any case, not a transitory signal). Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one computer memory 84 such as disk-based or solid state storage (in any case, not a transitory signal), and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
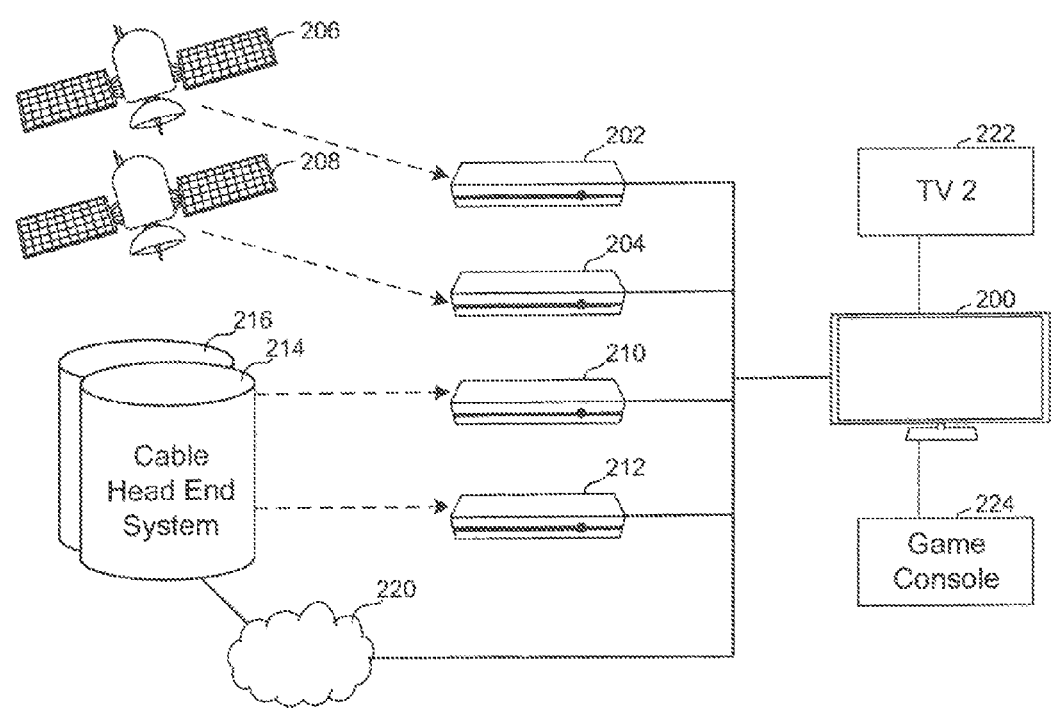
FIG. 2 is a block diagram of another system that can use the components of FIG. 1.

Now referring to FIG. 2, an AVDD 200 that may incorporate some or all of the components of the AVDD 12 in FIG. 1 is connected to at least one gateway for receiving content, e.g., UHD content such as 4K or 8K content, from the gateway. In the example shown, the AVDD 200 is connected to first and second satellite gateways 202, 204, each of which may be configured as a satellite TV set top box for receiving satellite TV signals from respective satellite systems 206, 208 of respective satellite TV providers.

In addition or in lieu of satellite gateways, the AVDD 200 may receive content from one or more cable TV set top box-type gateways 210, 212, each of which receives content from a respective cable head end 214, 216.

Yet again, instead of set-top box like gateways, the AVDD 200 may receive content from a cloud-based gateway 220. The cloud-based gateway 220 may reside in a network interface device that is local to the AVDD 200 (e.g., a modem of the AVDD 200) or it may reside in a remote Internet server that sends Internet-sourced content to the AVDD 200. In any case, the AVDD 200 may receive multimedia content such as UHD content from the Internet through the cloud-based gateway 220. The gateways are computerized and thus may include appropriate components of any of the CE devices shown in FIG. 1.

Tertiary devices may be connected, e.g., via Ethernet or universal serial bus (USB) or Wi-Fi or other wired or wireless protocol to the AVDD 200 in a home network (that may be a mesh type network) to receive content from the AVDD 200 according to principles herein. In the non-limiting example shown, a second TV 222 is connected to the AVDD 200 to receive content therefrom, as is a video game console 224. Additional devices including DVR-implemented CE device 44, 46 described above in reference to FIG. 1 may be connected to one or more tertiary devices to expand the network. The tertiary devices may include appropriate components of any of the CE devices shown in FIG. 1.

As referred to below, "MSO" stands for "multiple system operator" such as a cable or satellite TV operator, usually including, as hardware, one or more head ends from which content is provided to receivers in the system. Note further that note that "wired or wireless path" encompasses "exclusively wired" or "exclusively wireless" and also encompasses paths that may employ both wired and wireless media.

MSO-Centric DVR to DVR Transfer of Customer-Selected Content

Figure 3:
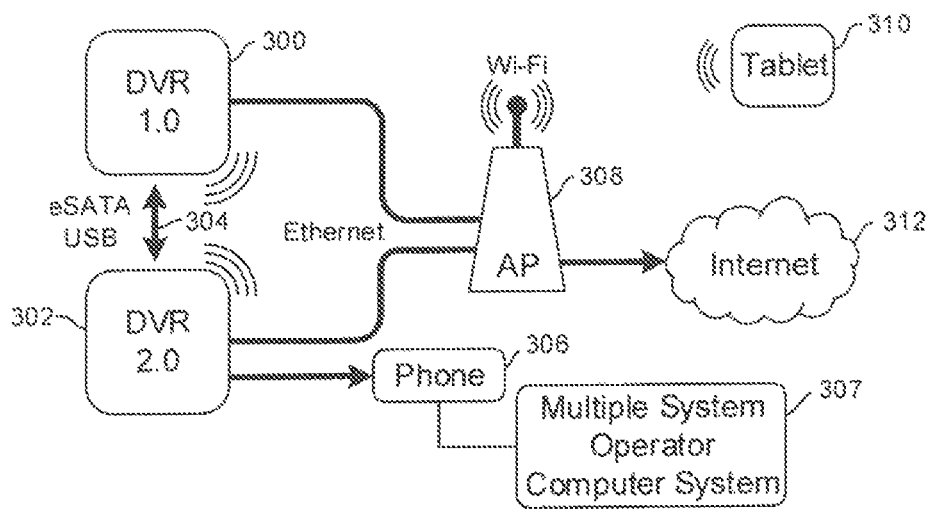
FIG. 3 is a block diagram of an example system with one or more DVRs.
Figure 4:
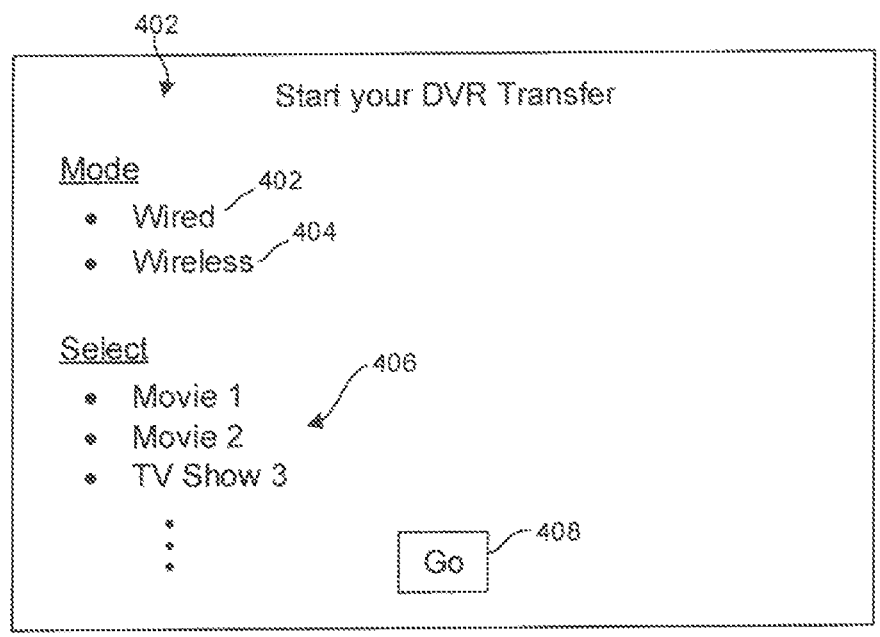
FIG. 4 is a screen shot of an example user interface (UI)
Figure 5:
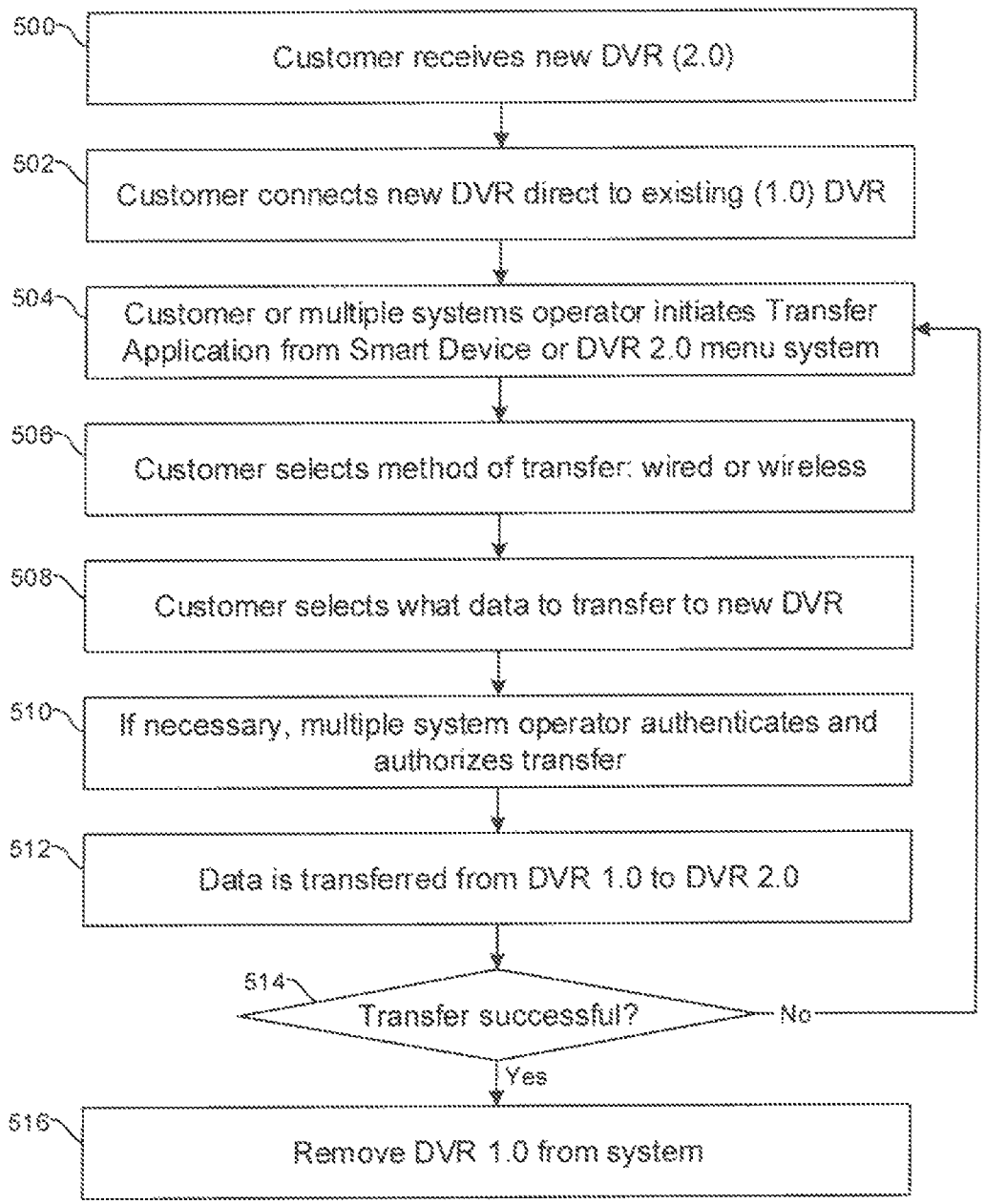
FIG. 5 is a flow chart of example logic, it being understood that programming may be state programming or other non-flow logic.

Now referring to FIGS. 3-5, an MSO-centric technique is illustrated to transfer recorded programs, season passes, and other personalization data from an existing (i.e., approved) DVR 300 ("DVR 1.0") to a newer DVR 302 ("DVR 2.0") that will replace the existing DVR 300 (or DVRs) in a household. "Transfer" can mean "send content from the existing DVR to the newer DVR and delete, erase, or otherwise render inaccessible the content on the existing DVR" or "copy content from the existing DVR to the newer DVR without erasing or deleting the content from the existing DVR".

As understood herein, when upgrading a home DVR system to the latest DVR technology, all recorded programs, season passes, and other preferences that are stored on the storage such as the hard disk drive (HDD) of the older DVR typically are lost, because there is no way to transfer that data over to the new DVR system, and the technique or techniques below provide a remedy for this inconvenience. Note that while DVR storage is referred to herein as being a HDD, present principles apply to other storage media of DVRs including universal serial bus (USB) flash drives, secure digital (SD) memory cards, and solid state drives (SSD).

In the example shown, the DVRs 300, 302 are directly connected to each other with no intervening components over a wired or wireless link 304. In examples, the link 304 can be a universal serial bus (USB) link, Ethernet link, or e-serial AT attachment (e-SATA) link.

At least the newer DVR 302 can be connected to a communication interface 306 such as but not limited to a telephone line, for two way communication with, e.g., an MSO computer system 307 of a cable head end of an MSO. It is to be understood that similarly depicted interfaces from DVRs herein are also communicatively coupled to an MSO computer system regardless of whether the MSO C.S. is shown.

Both DVRs 300, 302 may also be connected, via wired or wireless Ethernet, for example, to a wireless access point (AP) 308 to which one or more other CE devices such as a table computer 310 in the home network may also be connected via wired or wireless paths to the AP 308. The AP 308 in turn is connected to a wide area computer network 312 such as the Internet.

With the architecture of FIG. 3 in mind, attention is directed to FIG. 4, in which a display, which may be implemented by any of the display devices herein including on displays of the AVDD 12 in FIG. 1 embodied as a TV, or the tablet computer 310 or the newer DVR 302, for example, presents a UI with a prompt 400 for the customer to commence transfer of content from the older DVR 300 to the newer DVR 302.

The customer may select 402 a wired transfer mode or 404 a wireless transfer mode over the direct link 304 disclosed above. The customer may also select specific content on the older DVR 300 from a list 406 to be transferred to the newer DVR 302. A selector 408 can be provided on the UI as shown to cause the transfer to commence. Note that the list 406 may be obtained by the device presenting the UI of FIG. 4 from the older DVR 300 over one or more paths of the home network shown by querying for the list, which query can occur automatically by the device presenting the UI when the UI is invoked, as but one example.

FIG. 5 illustrates further. Block 500 simply indicates that the new DVR 302 is physically received within the home system shown in FIG. 3. At block 502 the direct link 304 of FIG. 3 is established, typically by the customer, between the older DVR 300 and newer DVR 302.

Proceeding to block 504, the UI of FIG. 4 may be invoked to execute logic to initiate the transfer of content between the DVRs of FIG. 3. As indicated in the discussion above with respect to FIG. 4, at block 506 the customer selects the communication mode of transfer of content and at block 508 the content to be transferred from the older DVR 300 to the newer DVR 302.

Block 510 indicates that in an embodiment, the digital rights management (DRM) and other information from the older DVR 300 may be authenticated. This authentication may be executed over the networks shown in FIG. 3 by the MSO computer system 307 automatically in response to initiation of the transfer by the customer by, e.g., selecting the selector 408 in FIG. 4 or upon initial invocation of the UI of FIG. 4. This may be executed using the two-way communication path through the interface 306. Of course, if authentication fails, the transfer process may be terminated and appropriate messages presented on the display shown in FIG. 4, but if authentication is successful, data transfer of the selected content can proceed at block 512.

The transfer of the selected content may be over the direct link 304 between the DVRs 300, 302. When the UI of FIG. 4 is presented on the tablet computer 310, upon initiation of the transfer the tablet computer 310 may signal the identity of the selected content to the older DVR 300 and command the older DVR 300 to begin transferring the identified selected content to the network address of the newer DVR 302. The tablet computer 310 may also send the selections from the list to the newer DVR 302 and the newer DVR 302 can audit the transfer from the older DVR 300 using the list, requesting retransmission of any content on the list that was not received or only partially received.

When the UI of FIG. 4 is presented on the newer DVR 302, upon initiation of the transfer the newer DVR 302 can command the older DVR 300, via the direct link 304 if desired and/or via the Internet/AP 308 and/or via the interface 306/MSO C.S. 307 to begin transferring the content on the list to the network address of the newer DVR 302. The newer DVR 302 can audit the transfer from the older DVR 300 using the list, requesting retransmission of any content on the list that was not received or only partially received.

In the event that the transfer is not successful at decision diamond 514, e.g., because of a broken or interrupted link, the logic can loop back to block 504. Otherwise, the older DVR 300 may be removed from the system at block 516 physically by the customer and/or logically by the system, e.g., by the MSO by revoking any necessary credentials for the DVR 300 to receive or transfer content. Additional "older" DVRs may be subject to the logic of FIG. 5 in succession.

Internet-Centric DVR to DVR Transfer of
Customer-Selected Content

Figure 6:
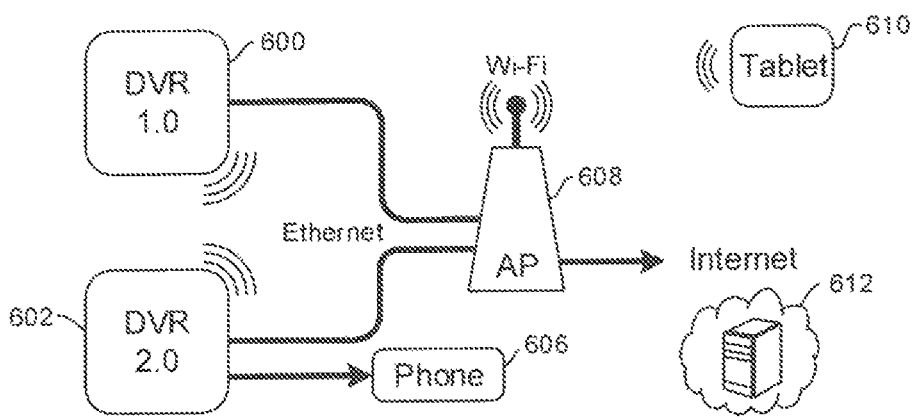
FIG. 6 is a block diagram of an example system with one or more DVRs.
Figure 7:
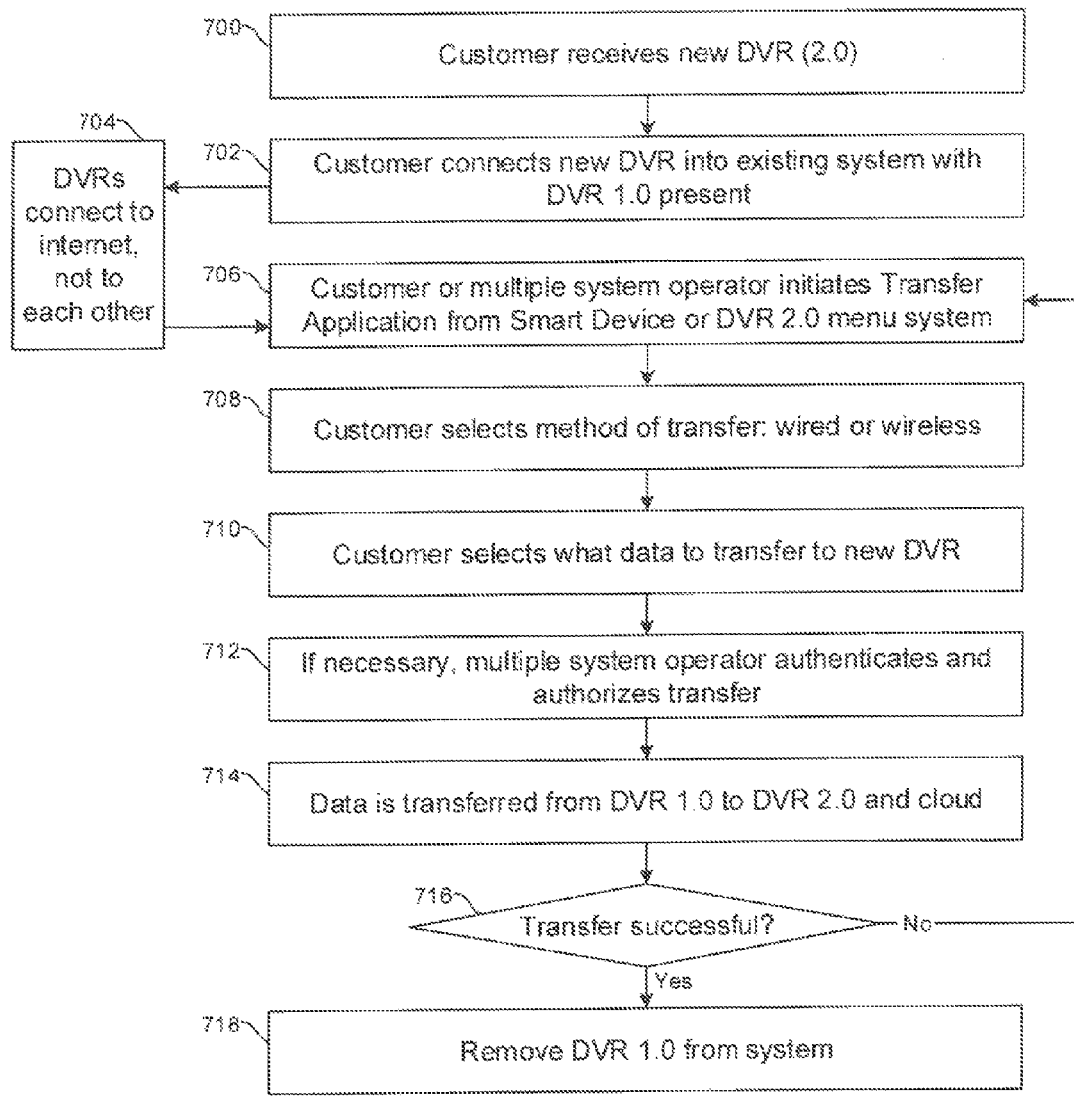
FIG. 7 is a flow chart of example logic.

Now referring to FIGS. 6 and 7, an Internet-centric technique is illustrated to transfer recorded programs, season passes, and other personalization data from an existing (i.e., approved) DVR 600 ("DVR 1.0") to a newer DVR 602 ("DVR 2.0") that will replace the existing DVR 600 (or DVRs) in a household.

In the example shown, the DVRs 600, 602 are not directly connected to each other, in contrast to the architecture of FIG. 3. At least the newer DVR 602 can be connected to a communication interface 606 such as but not limited to a telephone line, for connection to, e.g., a computer system associated with a cable head end of an MSO.

Both DVRs 600, 602 may also be connected, via wired or wireless Ethernet, for example, to a wireless AP 608 to which one or more other CE devices such as a table computer 610 in the home network may also be connected via wired or wireless paths to the AP 608. The AP 608 in turn is connected to a wide area computer network 612 such as the Internet.

With the architecture of FIG. 6 in mind, attention is directed to FIG. 7, it being understood that a UI similar to the UI presented in FIG. 4 may be presented on the tablet computer 610 or newer DVR 602 in connection with the logic of FIG. 7. Block 700 simply indicates that the new DVR 602 is physically received within the home system shown in FIG. 3. At block 702 the new DVR 602 is connected to the home network shown in FIG. 6 and at block 704 both DVRs 600, 602 are connected, e.g., through the AP 608 to the Internet 612 and/or or through their respective MSO interfaces and the MSO computer system, but not to each other directly.

Proceeding to block 706, the logic initiates the transfer of content between the DVRs of FIG. 6 using, e.g. the above-discussed UI. As indicated in the discussion above with respect to FIG. 4, at block 708 the customer may select the communication mode of transfer of content and at block 710 (except that the selection may not be between "wired" and "wireless" but between "MSO" and "Internet") may further select the content to be transferred from the older DVR 600 to the newer DVR 602. The transfer may be via the AP 608 to the Internet 612 and/or or through their respective MSO interfaces and the MSO computer system.

Block 710 indicates that in an embodiment, the digital rights management (DRM) and other information from the older DVR 600 may be authenticated. This authentication may be executed over the networks shown in FIG. 6 by the MSO automatically (over the Internet and AP and/or using the MSO interface as discussed previously) in response to initiation of the transfer by the customer by, e.g., selecting the selector 408 in FIG. 4. Of course, if authentication fails, the transfer process may be terminated and appropriate messages presented on the display shown in FIG. 4, but if authentication is successful, data transfer of the selected content can proceed at block 714.

The transfer of the selected content may be through the Internet via the AP 608 and/or through the MSO computer system and MSO interface. When the UI of FIG. 4 is presented on the tablet computer 610, upon initiation of the transfer the tablet computer 610 may signal the identity of the selected content to the older DVR 600 and command the older DVR 600 to begin transferring the identified selected content to the network address of the newer DVR 602 via the AP 608 and Internet. The tablet computer 610 may also send the selections from the list to the newer DVR 602 and the newer DVR 602 can audit the transfer from the older DVR 600 using the list, requesting retransmission of any content on the list that was not received or only partially received.

When the UI of FIG. 4 is presented on the newer DVR 602, upon initiation of the transfer the newer DVR 602 can command the older DVR 600, via the Internet and AP 608 and/or via the MSO interfaces and MSO C.S., to begin transferring the content on the list to the network address of the newer DVR 602. The newer DVR 602 can audit the transfer from the older DVR 600 using the list, requesting retransmission of any content on the list that was not received or only partially received.

Note that some of the content (or identification thereof) from the older DVR 600 alternatively may be stored temporarily on a cloud server such as the server 80 shown in FIG. 1 prior to providing the content back to the newer DVR 602. This technique can be used to speed the process, with any content in the cloud later downloaded transparently to the customer to the newer DVR 602 when bandwidth and time permits (and/or on demand of the content from the customer operating the newer DVR 602). In such a case, as long as the identification of the content is known to the cloud server, it need not upload the content itself, but only access the content using the uploaded identification from the original content source and download the content to the newer DVR 602. Thus, content that was recorded on the older DVR 600 (and/or only the identification thereof) may remain stored in the cloud and streamed to the newer DVR 602 upon customer demand.

In the event that the transfer is not successful at decision diamond 716, e.g., because of a broken or interrupted link, the logic can loop back to block 706. Otherwise, the older DVR 600 may be removed from the system at block 718 physically by the customer and/or logically by the system, e.g., by the MSO by revoking any necessary credentials for the DVR 600 to receive or transfer content. Additional "older" DVRs may be subject to the logic of FIG. 7 in succession.

Interactive Load Balancing Among DVRs Based on Customer Selection

Figure 8:
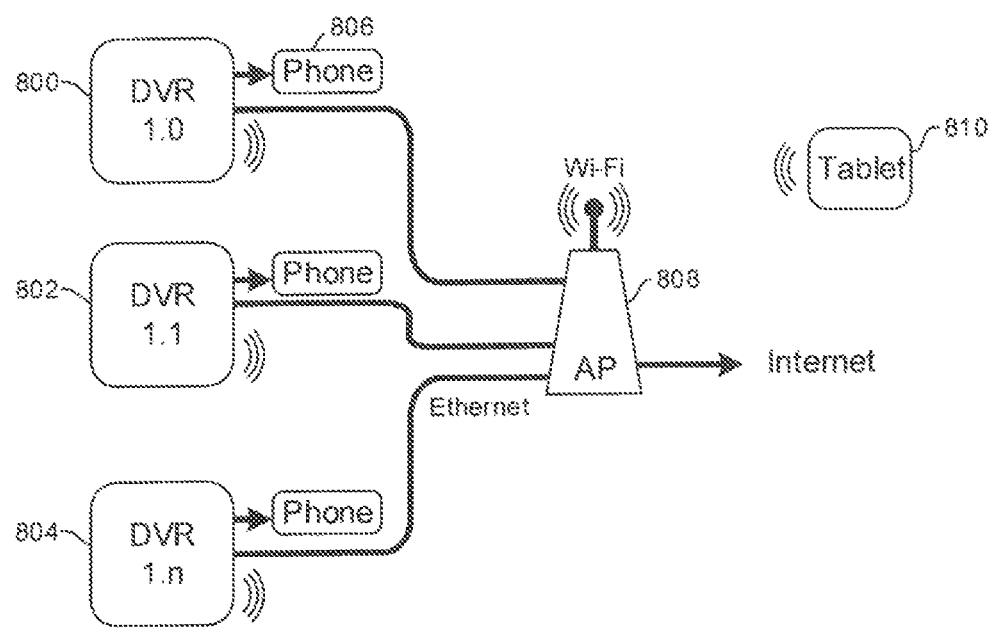
FIG. 8 is a block diagram of an example system with one or more DVRs.
Figure 9:
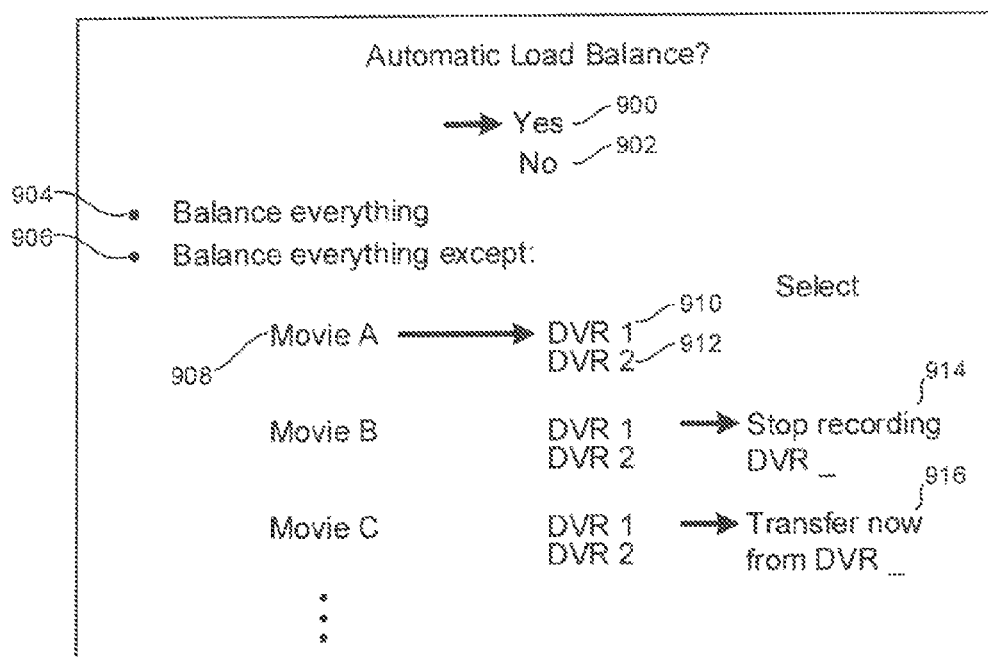
FIG. 9 is a screen shot of an example user interface (UI)
Figure 10:
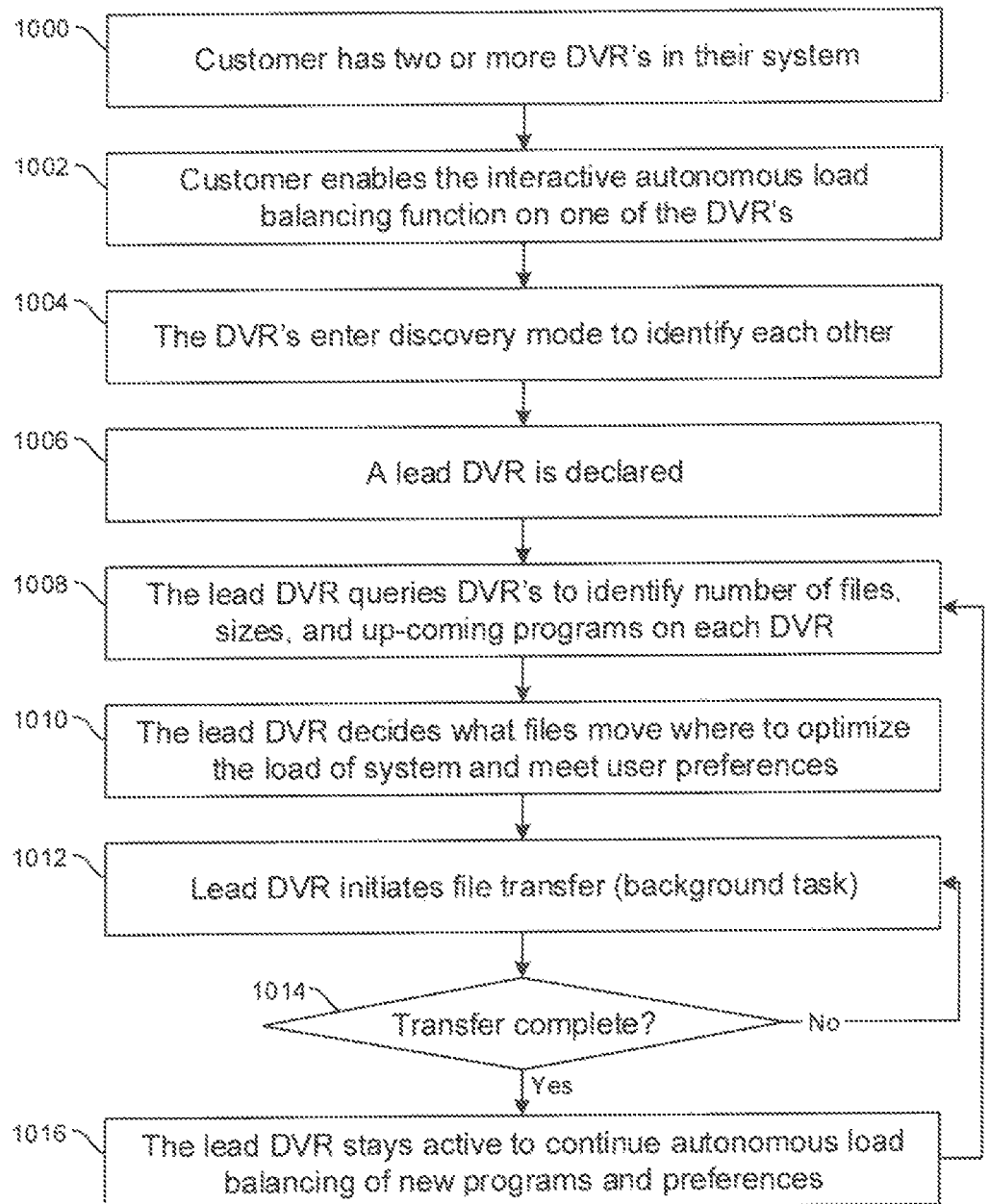
FIG. 10 is a flow chart of example logic.

FIGS. 8-10 illustrate techniques for interactive autonomous load balancing between plural DVRs in a home network (three DVRs 800, 802, 804 shown as an example) based on customer input preference. The customer preference(s) may include already recorded content, as well as upcoming content to be recorded.

As understood herein, in a home network having plural DVRs, it would be desirable to have the system decide which DVR should record upcoming events by taking into account customer preferences and automatically determining how to load balance the system without forcing the customer to make and input all the planning and decisions as to which machine should record upcoming programs.

As shown in FIG. 8, at least two or more DVRs (three shown) 800, 802, 804 are networked together using any one or combination of the above-described wired or wireless technologies. At least one and preferably all three DVRs in FIG. 8 are connected to a respective communication interface 806 such as but not limited to a telephone line, for connection to, e.g., a computer system associated with a cable head end of an MSO. The DVRs also may be networked together through a wireless AP 808 and thence to the Internet. Additional devices may be present in the home network including a tablet computer 810.

Through the AP 808 or using direct peer to-peer communication, the DVRs can detect one another using, e.g., UPnP discovery, and query each other as to what content and the size thereof that is stored on their respective HDDs. This initial part of the load balancing operation may be invoked by the customer using one of the DVRs or tablet computer in FIG. 8 to present the UI shown in FIG. 9 on the display of the device being employed by the customer.

As shown in FIG. 9, the customer may be presented with a selector 900 to start the load balancing described in FIGS. 8-10 and a selector 902 to decline the load balancing altogether. The customer may be presented with a selector 904 to command that all content be balanced as part of the algorithm below, relieving the customer of inputting any preferences if desired. However, the customer may also be presented with a selector 906 to balance all content except content selected from a drop-down list 908 of specific or generic content stored on each DVR. Such content is exempt from load balancing. Alternatively or in addition, the UI may include a drop-down list from which the customer can select content to be load-balanced.

In FIG. 9, for each item in the list 908, the customer may specify at 910 to store that content always on the first DVR 800 or may select 912 to store that content always on the second DVR 802 (the selector for the third DVR 804 is not shown for clarity), essentially exempting the selected content from the load balancing operation.

Thus, customer preferences that may be input to the UI of FIG. 9 may include (but are not limited to) commanding that an entire program series be recorded on only one specified DVR (as described), and not moved from that DVR by the load balancing operation, to discontinue recording content on a customer-identified DVR (by, e.g., entering the DVR identification in the stop recording field 914 of FIG. 9), and to immediately transfer content off of a user-specified DVR regardless of load balancing determinations (by, e.g., entering the DVR identification in the transfer now field 916 of FIG. 9). Thus, in this context "transfer" means remove content from one DVR and store it on another DVR.

Attention is now directed to FIG. 10, which begins at state 1000 by simply indicating that the home network executing the logic of FIG. 10 has two or more DVRs. At block 1002, the load balancing that follows is initiated using, e.g., the UI of FIG. 9 as described above.

Moving to block 1004, the DVRs shown in FIG. 8 discover each other as described. Using, for example, peer to peer negotiation techniques, a lead DVR is established among the DVRs at block 1006. As a simple example, the DVR having the smallest amount of content stored on it may be declared the lead DVR to execute the load balancing determinations.

Proceeding to block 1008, the DVRs exchange content lists and storage size of each content and/or storage size of each element of each piece of content, such as but not limited to the storage size of each block of content, number of files of content and sizes, etc. If desired, for content that the customer has exempted from load balancing as described above, the DVR storing that content may be so informed any may not include that content in the list exchanged with the other DVRs.

Moving to block 1010, the lead DVR executes a load balancing algorithm to determine which content elements (such as files), if any, to move from the first DVR 800 to the second DVR 802 and/ or third DVR 804, excepting content the customer has exempted as described previously. The load balancing algorithm may be similarly employed to determine which content elements (if any) to move from the second and third DVRs 802, 804 to another DVR in the home network of FIG. 8. Note that (non-exempt) content already recorded may be transferred between the DVRs as part of load balancing, and furthermore how best to record future content may be determined by assigning one of the DVRs of the home network to be the "next" DVR to use for recording the next selection of content by the customer. The load balancing may be executed peer-to-peer via Wi-Fi or Bluetooth or other direct communication link, and/or it may be executed through any of the network paths shown, including through the MSO computer system and/or Internet Without limitation, the load balancing algorithm may be based on one or more of the following. The load balancing may be predicated on available storage space, with (non-exempt) content from the DVR that is "most full" being transferred to the DVR that is "less full" until both DVRs store approximately the amount of data, within a threshold, e.g., 5%. In addition or alternatively, the load balancing may further be based on how much space is needed for upcoming events, taking into account customer preferences, and still maintain optimum load balancing of the system. Thus, an exemption established as described above may be overridden by the system when, for instance, the customer has commanded that Program A always be recorded on the first DVR 800, but the first DVR 800 is determined to have available storage less than a threshold, which may be dynamically determined if desired in reference to the size of the program sought to be recorded (e.g., available space must be at least some percentage of the size of the program to be recorded). In such a case, the lead DVR may command the second DVR 802 to record the otherwise exempt program, notifying the customer of such by a message presented on, e.g., the DVR that was originally established by the customer to record the particular content, and/or on the DVR that the load balancing algorithm identified to record the content to override the exemption, and/or on the tablet computer 810.

Other statistics that may be used to move existing content in the home network between DVRs and/or to determine which DVR should record new content include but are not limited to DVR HDD workload. For example, DVR HDD waiting time can be used, with longer waiting times indicating a DVR to which content should be transferred and shorter waiting times indicating content from which content should be transferred. If no DVR has a waiting time satisfying a longer waiting time threshold, the load balancing algorithm may elect to not transfer content from a DVR even if the wait time satisfies a short wait time threshold that otherwise would trigger a transfer.

An additional or alternative measure of DVR workload is "busyness", meaning that the load balancing algorithm may transfer content from a DVR whose input/output (I/O) operations satisfy a "busyness" threshold to a DVR that is less busy. If no DVR has a busyness satisfying a less busy threshold, the load balancing algorithm may elect to not transfer content from a DVR even if the busyness satisfies a busyness threshold that otherwise would trigger a transfer.

As yet another measure that may be used in addition to or in lieu of the above statistics, the rate of I/O operations (e.g., per second, per minute, per day, etc.) performed may be used as the measure of DVR workload, with content being transferred from a DVR with an I/O rate satisfying a "high" threshold to a DVR whose I/O rate satisfies a "low" threshold. If no DVR satisfies the "low" threshold, the load balancing algorithm may elect to not transfer content from the DVR with a high I/O rate.

The workload and other statistics above may be obtained from, e.g., the operating systems of the DVRs, or the load balancing algorithm itself may include a monitoring component to gather the statistics.

Moving to block 1012, the data transfer determined at block 1010 is executed by, e.g., the lead DVR commanding the other DVRs to transfer files as determined by the lead DVR. This may be executed as a background or low priority task, secondary to presented demanded video on a display in the home network, for example. The load balancing loops between decision diamond 1014 and block 1012 until all determined transfers are complete, and which point file transfer terminates at block 1016 and the lead DVR remains active to monitor for new programs and preferences to which to apply the above load balancing principles.

By autonomously load balancing the system, the customer need not concern himself with what content is stored on which DVR or if there is enough disk space on a particular DVR to record new content, at the same time possessing a certain amount of interactive choice to customize the load balancing as desired by the customer.

Automatic MSO-Based Transfer of DVR Content to New Location of Customer

Figure 11:
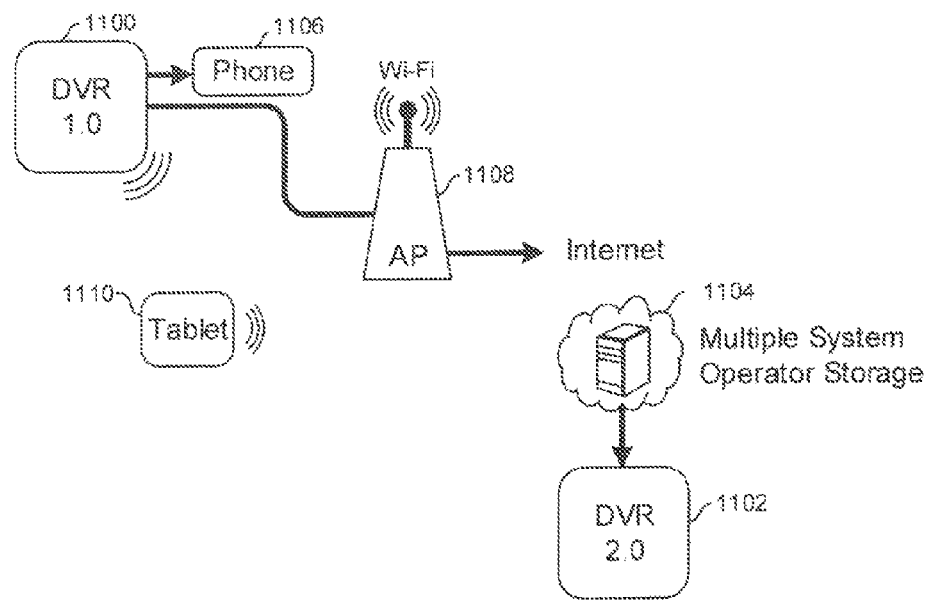
FIG. 11 is a block diagram of an example system with one or more DVRs.
Figure 12:
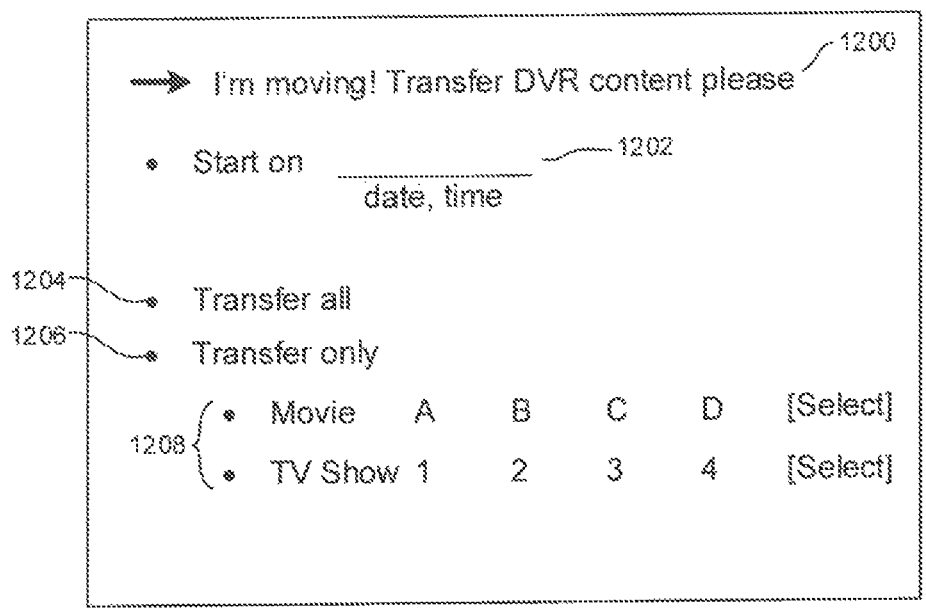
FIG. 12 is a screen shot of an example user interface (UI)
Figure 13:
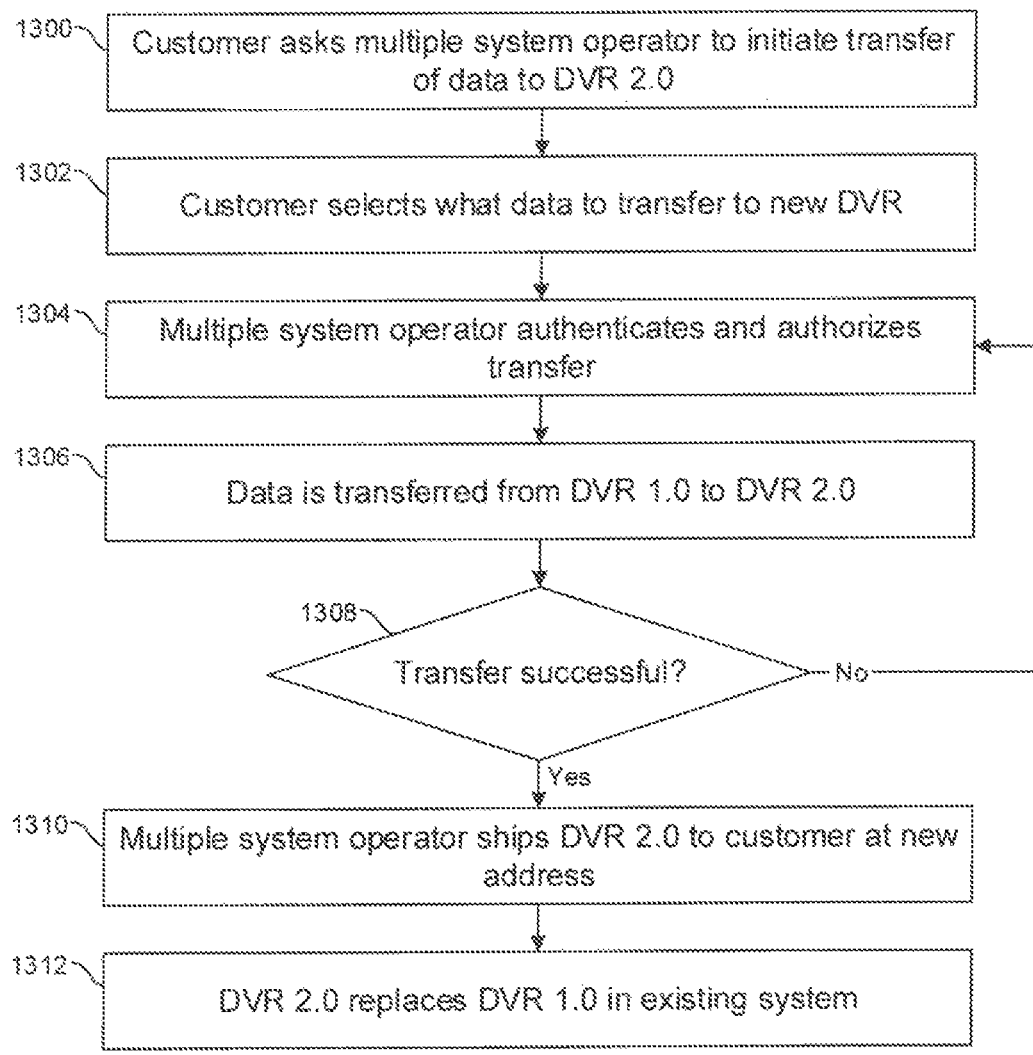
FIG. 13 is a flow chart of example logic.

FIGS. 11-13 illustrate a technique for ensuring that a customer moving to a new location will be provided DVR service in a timely manner, in which the MSO transfers recorded programs, season passes, and other personalization data from an existing (i.e., approved) DVR 1100 to a newer DVR via storage 1104 in a wide area computer network. The existing DVR 1100 can be connected to a communication interface 1106 such as but not limited to a telephone line, for connection to, e.g., a computer system associated with a cable head end of an MSO. The existing DVR 1100 may also be connected, via wired or wireless Ethernet, for example, to an AP 1108, which in turn communicates with the wide area computer network. The AP 1108 may also communicate with one or more other CE devices such as a table computer 1110 in the home network.

With the architecture of FIG. 11 in mind, attention is directed to FIG. 12, in which a display, which may be implemented by any of the display devices herein including on displays of the tablet computer 1110 or the existing DVR 1100, for example, presents a UI 1200 to enable a customer to migrate content from the existing DVR 1100 to the newer DVR 1102 to prepare for a move to another location. The customer can enter a migration date and time into start fields 1202. A similar field for desired delivery date and time of the new DVR may also be provided. The customer may also select at 1204 to transfer all of the content on the existing DVR 1100 to the newer DVR 1102, or can select at 1206 to transfer only content selected by the customer from a list or menu 1208.

Refer now to FIG. 13. Commencing at block 1300, the customer requests content migration from the existing DVR 1100 to the newer DVR 1102, which initially may be physically located at an MSO facility. The request may be made, in an example, using a UI such as the UI 1200. When the customer has elected to specify what content to migrate, the selection is made and communicated to the MSO at block 1302.

Proceeding to block 1304, in an embodiment, the digital rights management (DRM) and other information from the existing DVR 1100 may be authenticated. This authentication may be executed over any the networks shown in FIG. 11 by the MSO automatically in response to initiation of the transfer by the customer using the UI 1200 or upon initial invocation of the UI 1200. Of course, if authentication fails, the transfer process may be terminated and appropriate messages presented on the display shown in FIG. 12, but if authentication is successful, data transfer of the selected content from the existing DVR 1100 to the newer DVR 1102 can proceed at block 1306 via the AP 1108 and wide area computer network storage 1104 and/or via the MSO interface and MSO computer system, where the content is staged and transferred to the newer DVR 1102.

The logic loops between decision diamond 1308 and block 1304 until all designated content from the existing DVR 1100 has been received in the network storage 1104. Between then and a customer-established delivery date, the MSO can add to the staged content any additional content that would normally be recorded during the move as indicated in the customer preferences transferred to the MSO, so the customer doesn't miss recording any content. At block 1310, the newer DVR 1102 is loaded with the staged content from the existing DVR 1100 in the storage 1104, along with any content recorded during the move per customer preferences, and shipped to the customer at his new location. The customer has virtually no setup, simply replacing the existing DVR 1100 with the newer DVR 1102 at block 1312.

Note that content which is available as an on-demand feature need not be uploaded in the process above from the existing DVR 1100. Instead, names or other identifications of such content is added to the customer's library of DVR data, since such content already exists in network storage. On the other hand, content that is not readily available on network storage is uploaded as described, if desired in the background without the customer knowing.

The advantage to this approach is that the customer has little to no effort to setup the new DVR, since all of the content, season passes, and other personalized data has been transferred to the new DVR. And the customer doesn't miss any of their favorite shows because of the move.

DVR Content Backup Using Another DVR or Another HDD on the Same DVR

Figure 14:
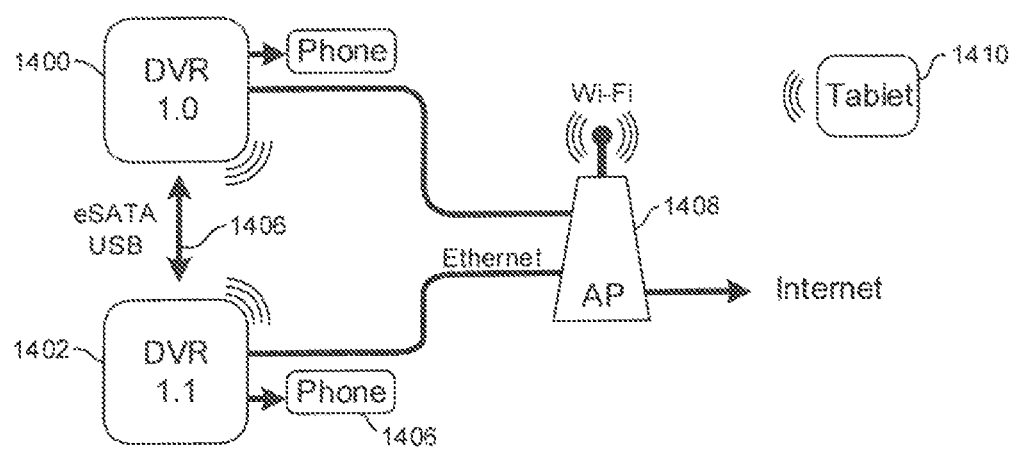
FIG. 14 is a block diagram of an example system with one or more DVRs.
Figure 15:
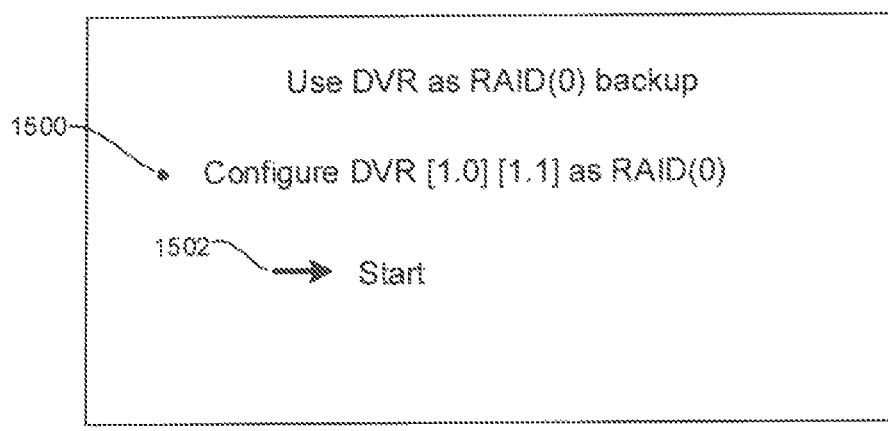
FIG. 15 is a screen shot of an example user interface (UI)
Figure 16:
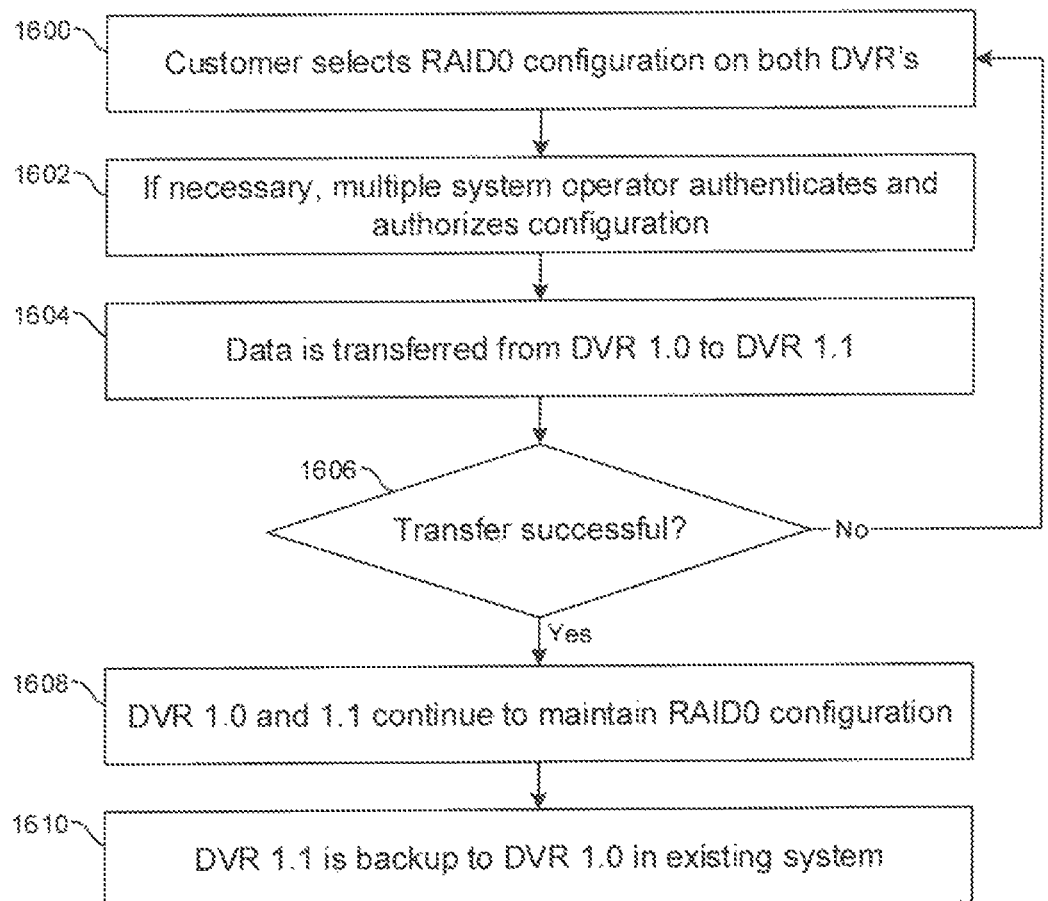
FIG. 16 is a flow chart of example logic.

FIGS. 14-16 illustrate techniques for home networks having two more DVRs 1400, 1402 (or multiples of two) that can be configured such that the HDD of the first DVR 1400 is mirrored to the HDD of the second DVR 1402 as in a redundant array of independent disks (RAID) 1 configuration. Alternatively, each DVR 1400, 1402 may be equipped with two HDDs configured as RAID 1, so that there is always a backup of the DVR's data, since one HDD is mirrored to the second HDD.

Present principles thus understand that on occasion, it would be advantageous to have a backup of data stored on the HDD of a DVR (e.g., in the event of HDD crash, other system problems, etc.). Currently there is no way for the customer to be able to back up content, season passes, or other data on their DVR. Moreover, when upgrading a whole home DVR system to the latest whole home DVR system all recorded programs, season passes, and other preferences that are stored on the DVR are lost, because there is no way to transfer that data over to the new DVR system. As understood herein, customers desire to clone the old DVR or DVRs to a new DVR or set of DVRs.

In the example shown, the DVRs 1400, 1402 are directly connected to each other with no intervening components over a wired or wireless link 1404. In examples, the link 1404 can be a USB link, Ethernet link, or e-SATA link.

At least the second DVR 1402 can be connected to a communication interface 1406 such as but not limited to a telephone line, for connection to, e.g., a computer system associated with a cable head end of an MSO.

Both DVRs 1400, 1402 may also be connected, via wired or wireless Ethernet, for example, to an AP 1408 to which one or more other CE devices such as a table computer 1410 in the home network may also be connected via wired or wireless paths to the AP 1408. The AP 1408 in turn is connected to a wide area computer network such as the Internet.

With the architecture of FIG. 14 in mind, attention is directed to FIG. 15, in which a display, which may be implemented by any of the display devices herein including on displays of the tablet computer 1410 or a DVR 1400 or 1402, for example, presents a UI with a selector 1500 to configure a selectable one of the DVRs shown in FIG. 14 as a backup DVR. A start selector 1502 may be provider to start the configuration and backup logic of FIG. 16.

Commencing at block 1600 in FIG. 16, the customer selects the backup configuration for both DVRs in FIG. 14 using, e.g., the UI shown in FIG. 15. Proceeding to block 1602, in an embodiment, the digital rights management (DRM) and other information of the DVR sought to be the source of the backup data transfer may be authenticated. This authentication may be executed over the networks shown in FIG. 14 by the MSO automatically in response to initiation of the transfer by the customer using the UI of FIG. 15 or upon initial invocation of the UI. Of course, if authentication fails, the transfer process may be terminated and appropriate messages presented on the display shown in FIG. 15, but if authentication is successful, data backup of the selected content from the source DVR to the target DVR can proceed at block 1604 via the AP 1108 and wide area computer network storage 1104, and/or via the direct link 1404.

The logic loops between decision diamond 1606 and block 1600 until such time as all content has been backed up from the source DVR to the target DVR, at which point backup ends at block 1608 with the DVRs monitoring each other for new content to be backed up. If desired, the same logic may be executed at block 1610 to backup content on the target DVR to the source DVR.

The backup of data can occur automatically (real time), scheduled periodically (e.g., once a week), implemented by customer command, or any combination thereof.

The same logic applies as between two HDDs within a single DVR, in which one HDD is the source HDD from which content is copied and the other HDD is the target HDD onto which consent is copied from the source HDD.

Dynamic Load Balancing Among DVRs of Already-Recorded Content

Figure 17:
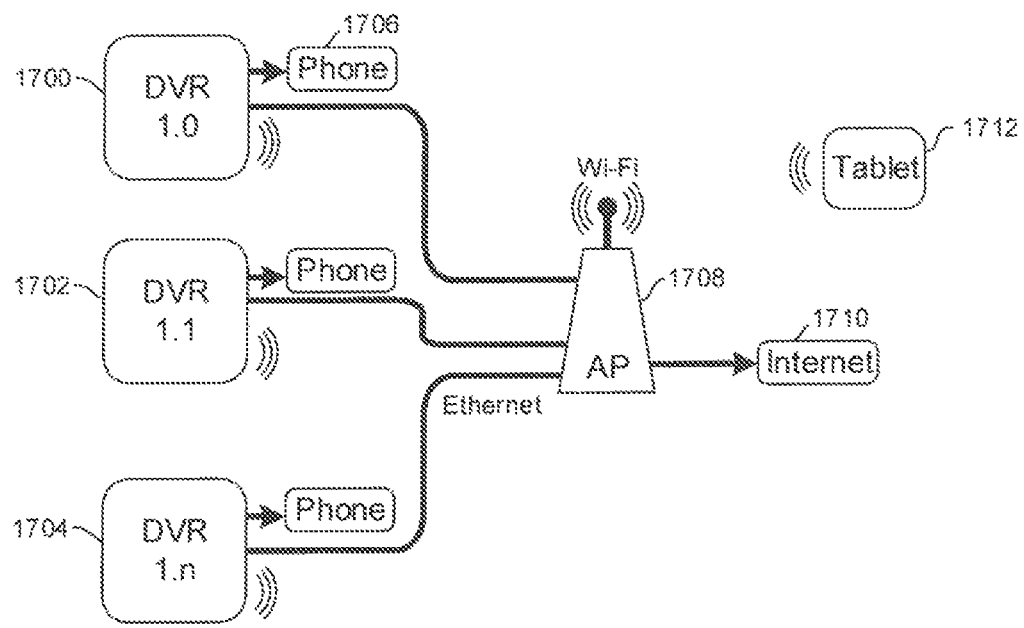
FIG. 17 is a block diagram of an example system with one or more DVRs.
Figure 18:
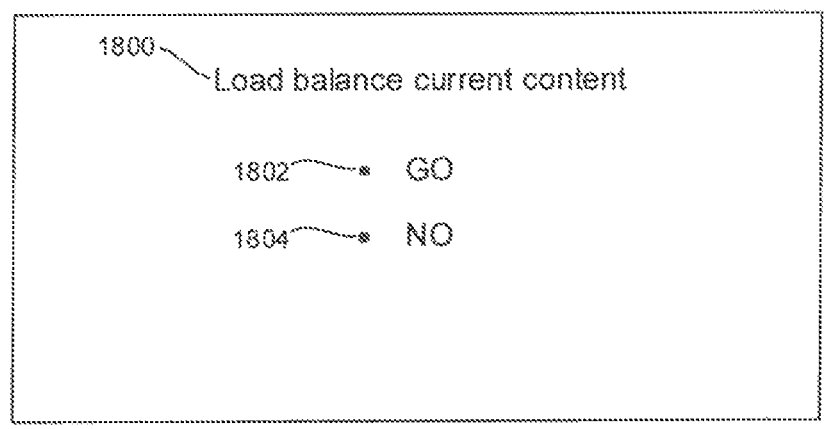
FIG. 18 is a screen shot of an example user interface (UI)
Figure 19:
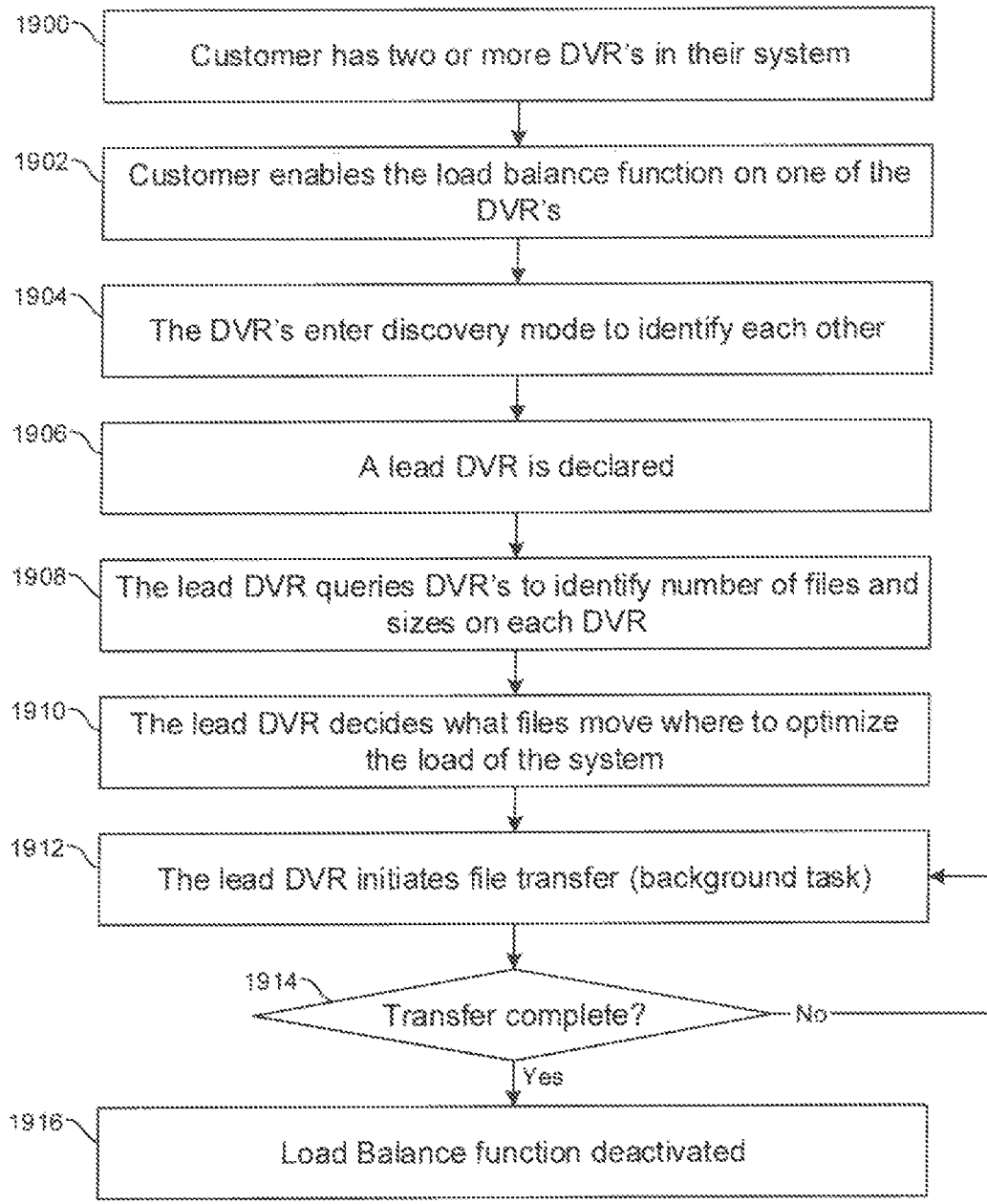
FIG. 19 is a flow chart of example logic.

FIGS. 17-19 illustrate techniques for load balancing of existing, already-recorded content among multiple DVRs in a home network, with the customer doing nothing more than enabling and disabling load balancing without customization. As understood herein, in a system of multiple DVR's, there are times when at least one DVR has a HDD that is getting relatively full compared to the other DVR(s), and it would be desirable to move some of the content from one DVR to the other to load balance the system.

As shown in FIG. 17, at least two or more DVRs (three shown) 1700, 1702, 1704 are networked together using any one or combination of the above-described wired or wireless technologies. At least one and preferably all three DVRs in FIG. 17 are connected to a respective communication interface 1706 such as but not limited to a telephone line, for connection to, e.g., a computer system associated with a cable head end of an MSO. The DVRs also may be networked together through a wireless AP 1708 and thence to the Internet 1710. Additional devices may be present in the home network including a tablet computer 1712.

Through the AP 1708 or using direct peer-to-peer communication, the DVRs can detect one another using, e.g., UPnP discovery, and query each other as to what content and the size thereof that is stored on their respective HDDs. This initial part of the load balancing operation may be invoked by the customer using one of the DVRs or tablet computer in FIG. 17 to present the UI shown in FIG. 18 on the display of the device being employed by the customer.

As shown in FIG. 18, the customer may be presented with a prompt 1800 to enable load balancing of currently stored content among the DVRs 1700, 1702, 1704. An accept selector 1802 may be selected to enable load balancing, while a decline selector 1804 may be provided to disable load balancing.

Attention is now directed to FIG. 19, which begins at state 1900 by simply indicating that the home network executing the logic of FIG. 19 has two or more DVRs. At block 1902, the load balancing that follows is enabled using, e.g., the UI of FIG. 18 as described above.

Moving to block 1904, the DVRs shown in FIG. 17 discover each other as described. Using, for example, peer to peer negotiation techniques, a lead DVR is established among the DVRs at block 1906. As a simple example, the DVR having the smallest amount of content stored on it may be declared the lead DVR to execute the load balancing determinations.

Proceeding to block 1908, the DVRs exchange content lists and storage size of each content and/or storage size of each element of each piece of content already stored on the DVRs, such as but not limited to the storage size of each block of content, number of files of content and sizes, etc.

Moving to block 1910, the lead DVR executes a load balancing algorithm to determine which content elements (such as files), if any, to move from the first DVR 1700 to the second DVR 1702 and/or third DVR 1704. The load balancing algorithm may be similarly employed to determine which content elements (if any) to move from the second and third DVRs 1702, 1704 to another DVR in the home network of FIG. 17. Note that content already recorded may be transferred between the DVRs as part of load balancing, but how best to record future content may be left to the user's determination and/or to the logic in FIGS. 20-22 described further below. The load balancing of current content may be executed peer-to-peer via Wi-Fi or Bluetooth or other direct communication link, and/or it may be executed through any of the network paths shown, including through the MSO computer system and/or Internet.

Without limitation, the load balancing algorithm may be based on one or more of the above-described algorithms.

Moving to block 1912, the data transfer determined at block 1910 is executed by, e.g., the lead DVR commanding the other DVRs to transfer files as determined by the lead DVR. This may be executed as a background or low priority task, secondary to presented demanded video on a display in the home network, for example. The load balancing loops between decision diamond 1914 and block 1912 until all determined transfers are complete, and which point file transfer terminates at block 1916 and the lead DVR remains active to monitor for new programs to which to apply the above load balancing principles automatically as the load balancing algorithm dictates as content is accumulated on the DVRs.

By autonomously load balancing the system, the customer need not concern himself with what content is stored on which DVR or if there is enough disk space on a particular DVR to record new content.

Autonomous Load Balancing Among DVRs of New and Future Content

Figure 20:
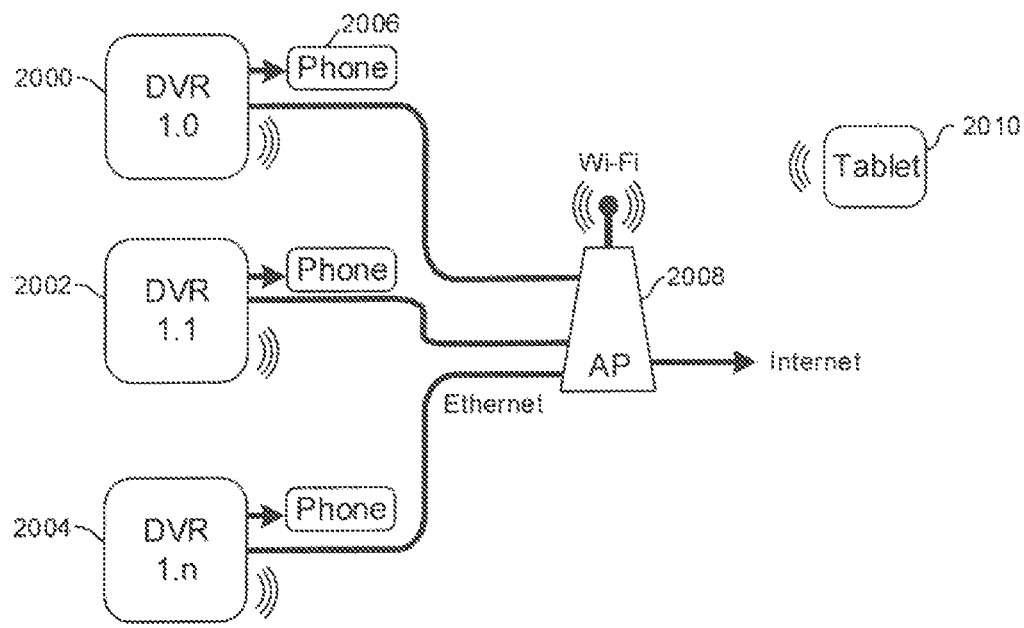
FIG. 20 is a block diagram of an example system with one or more DVRs.
Figure 21:
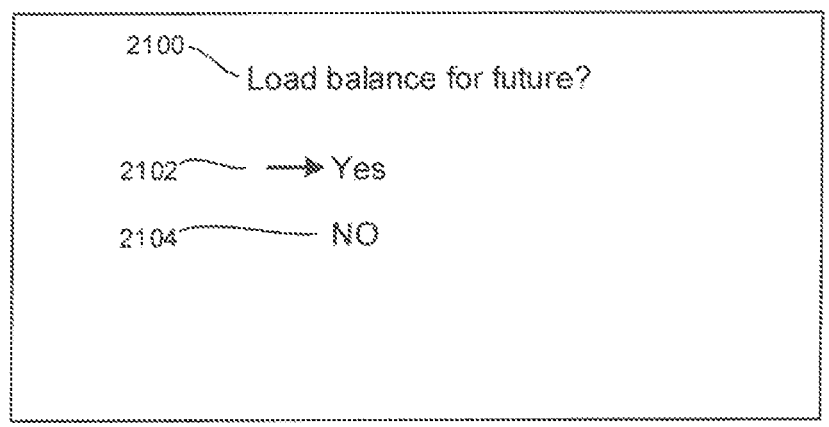
FIG. 21 is a screen shot of an example user interface (UI)
Figure 22:
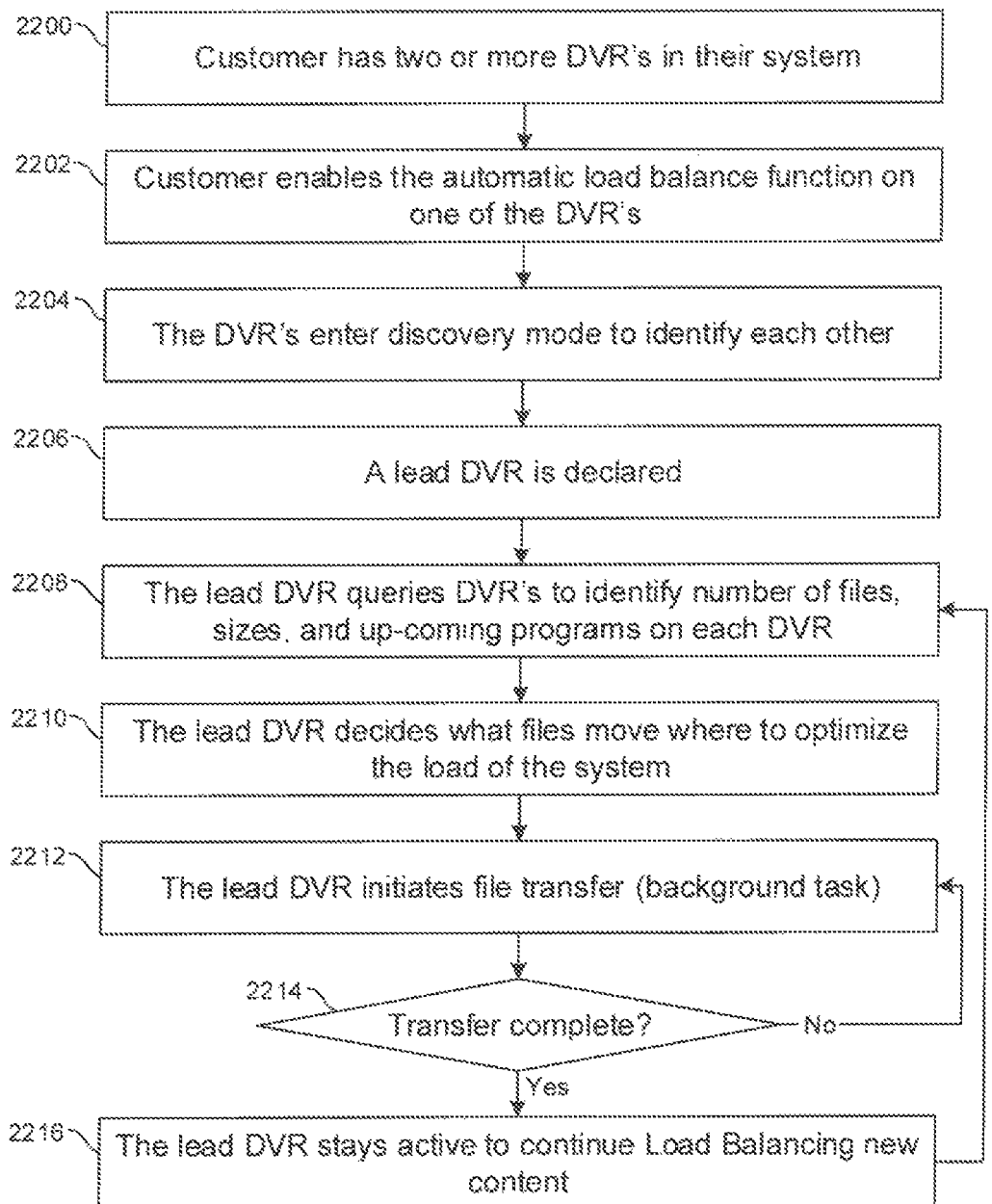
FIG. 22 is a flow chart of example logic.

FIGS. 20-22 illustrate techniques for load balancing of future (to be recorded) content among multiple DVRs in a home network, with the customer doing nothing more than enabling and disabling load balancing without customization.

As shown in FIG. 20, at least two or more DVRs (three shown) 2000, 2002, 2004 are networked together using any one or combination of the above-described wired or wireless technologies. At least one and preferably all three DVRs in FIG. 20 are connected to a respective communication interface 2006 such as but not limited to a telephone line, for connection to, e.g., a computer system associated with a cable head end of an MSO. The DVRs also may be networked together through a wireless AP 2008 and thence to the Internet. Additional devices may be present in the home network including a tablet computer 2010.

Through the AP 2008 or using direct peer-to-peer communication, the DVRs can detect one another using, e.g., UPnP discovery, and query each other as to what content and the size thereof that is stored on their respective HDDs. This initial part of the load balancing operation may be invoked by the customer using one of the DVRs or tablet computer in FIG. 20 to present the UI shown in FIG. 21 on the display of the device being employed by the customer.

As shown in FIG. 21, the customer may be presented with a prompt 2100 to enable load balancing of to-be-recorded content among the DVRs 2000, 2002, 2004. An accept selector 2102 may be selected to enable load balancing, while a decline selector 2104 may be provided to disable load balancing.

Attention is now directed to FIG. 22, which begins at state 2200 by simply indicating that the home network executing the logic of FIG. 22 has two or more DVRs. At block 2202, the load balancing that follows is enabled using, e.g., the UI of FIG. 21 as described above.

Moving to block 2204, the DVRs shown in FIG. 20 discover each other as described. Using, for example, peer to peer negotiation techniques, a lead DVR is established among the DVRs at block 2206. As a simple example, the DVR having the smallest amount of content stored on it may be declared the lead DVR to execute the load balancing determinations.

Proceeding to block 2208, the DVRs exchange content lists and storage size of each content and/or storage size of each element of each piece of content to be recorded in the future, such as but not limited to the storage size of each block of content, number of files of content and sizes, etc.

In executing block 2208, the DVRs access future recording instructions that the customer has input to them, identifying the program(s) to be recorded in the future. Such instructions may be on a program-by-program basis or on a series basis, e.g., "record all episodes of Rockford Files." The DVRs may use the identities of the programs commanded to be recorded as entering argument to a network data store at the MSO or on the Internet to retrieve the size of the content sought to be recorded. Or, for future programs in a series for which one or more previous programs have already been recorded, the DVRs can simply determine from internal storage how much storage space the previous programs consumed and infer that the future programs in that series will consume the same amount of storage space. Yet again, a DVR can access an electronic program guide (EPG) listing the to-be-recorded program and determine from the length of the program as indicated by the EPG and the format of the program as indicated by the EPG (e.g., high definition (HD) or standard definition (SD)) how much space the program will consume. As an example, the DVR may be programmed with information indicating that every ten minutes of SD video consumes X amount of storage, whereas every ten minutes of HD video consumes X×ΔX amount of storage.

Moving to block 2210, the lead DVR executes a load balancing algorithm to determine which content elements (such as files), if any, to store on what DVR in the system using any of the load balancing algorithms described previously. The load balancing of current content may be executed by commanding a DVR selected to be the DVR to record an upcoming program to record that upcoming program, without the other DVRs recording the program.

Moving to block 2212, the data transfer determined at block 2210 is executed by, e.g., the lead DVR commanding the other DVRs to record programs as determined by the lead DVR. The load balancing loops between decision diamond 2214 and block 2212 until all determined recordings are complete, and which point recording terminates at block 2216 and the lead DVR remains active to monitor for new recording commands for future recordings to which to apply the above load balancing principles automatically as the load balancing algorithm dictates.

DVR Community Network for Quick Access to Shared Content

Figure 23:
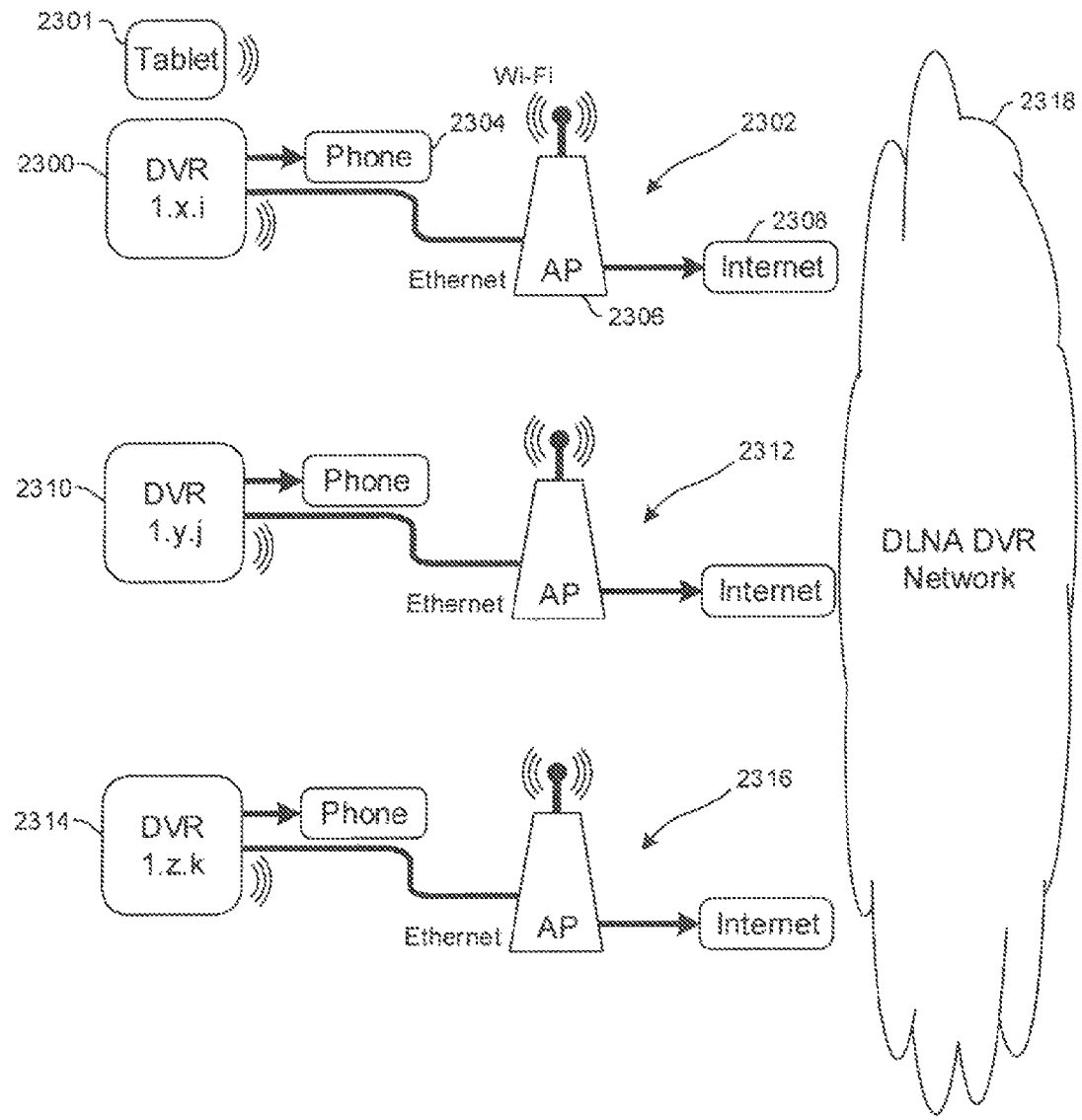
FIG. 23 is a block diagram of an example system with one or more DVRs.
Figure 24:
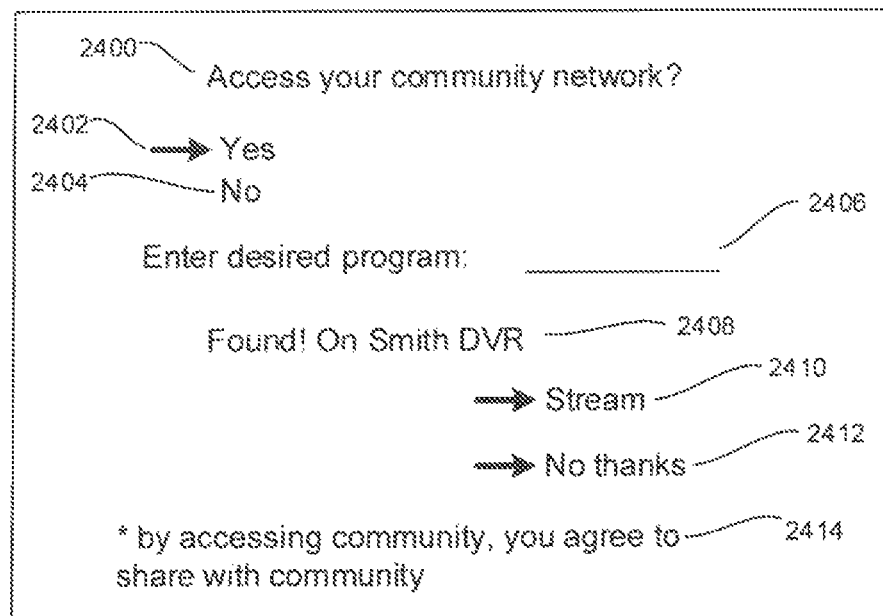
FIG. 24 is a screen shot of an example user interface (UI)

FIGS. 23 and 24 illustrate a community mesh/DLNA-based network to link multiple customers' DVRs together for the purposes of allowing access to sharing individuals' recorded TV programs or content on their DVR or media servers, over a community-wide network generally all belonging to the same MSO. Such a network expands the storage capacity of each customer, while also creating an enhanced new feature for customers. In this way, customers can access, from the community network, programs they may have missed recording for by allowing access to the recordings of other customers in the network.

As shown in FIG. 23, a first customer establishment includes at least one DVR 2300 and may include one or more other devices such as a tablet computer 2301. The DVR 2300 is located in the first customer establishment 2302 such as a home or apartment and is connected to a respective communication interface 2304 such as but not limited to a telephone line, for connection to, e.g., a computer system associated with a cable head end of an MSO. The DVR also may communicate through a wireless AP 2306 and thence to the Internet 2308.

FIG. 23 also illustrates that at least a second DVR 2310 with the same or similar components as in the first establishment 2302 is disposed in a second customer establishment 2312, while at least a third DVR 2314 is disposed in a third customer establishment 2316. Typically the resulting network 2318 shown in FIG. 23 includes more than three customers in more than three establishments.

FIG. 24 illustrates a UI that may be presented on a device in a customer establishment to enable the customer to participate in the network 2318. As shown, the customer is prompted at 2400 to access the community network 2318. An accept selector 2402 can be selected to join the network, and a decline selector 2404 is selectable to refuse to join the network.

Assuming the customer has joined the network, a field 2406 may be provided to enable the customer to input the name of a program the customer desires to access on another DVR in another establishment on the network 2318. FIG. 24 as an example assumes that the requested program in the field 2406 has been found at a network ligation named "Smith DVR". A stream selector 2410 is selectable to cause the program to be streamed from the "Smith DVR" to the establishment presenting the UI of FIG. 24 for play and/or recording at the establishment presenting the UI of FIG. 24. The data can be transferred over the Internet and/or over the MSO's infrastructure including through the MSO interfaces 2304. The customer can also select a decline selector 2412 to refuse to stream the program from the Smith DVR.

In some examples, a message 2414 may also be presented to inform the customer that by accessing content on the community network 2318, the customer agrees to share his locally stored content on his own DVR(s) with other members of the community.

In this way, access to recorded content is immediate, as long as someone in the "shared DVR" community has the recorded content available.

Another use of the network 2318 is sharing recorded video gameplay from a game console, for example, with other gaming members within the same network without having to send the stream directly. Each customer could "see" videos without having to upload and access YouTube (for example).

Using the MSO's infrastructure for communicating between DVRs is preferred. Expansion of or extended use of DLNA commercial video profile (CVP)-2, or similar technology, may be used. As another alternative, a public MSO network, such as Comcast's public Wi-Fi hotspots, can be used for data transfer between DVRs in different customer establishments.

DVR Replacement Using Cloud or Home Server for Backup

Figure 25:
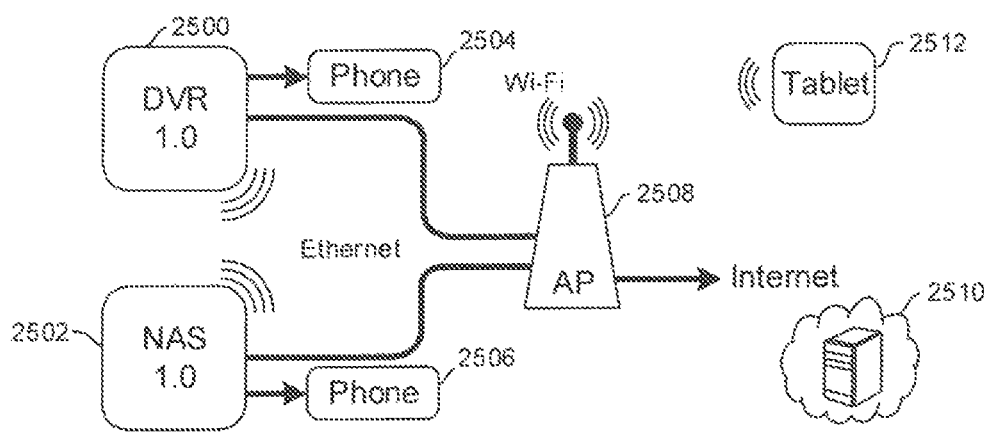
FIG. 25 is a block diagram of an example system with one or more DVRs.

As shown in FIG. 25, at least one DVR 2500 may be provided in an establishment along with at least one local storage 2502 such as a network attached storage (NAS). In examples, the local storage 2502, when implemented as a NAS, can be a file-level computer data storage server specialized for serving files either by its hardware, software, or configuration. The NAS may be implemented by a purpose-built specialized computer and typically includes one or more storage drives that can be in a RAID configuration. Note that while a NAS is shown, more generally the storage represented by the element 2502 may be any device containing usable, free storage, such as a Home Gateway, game console such as a Playstation-4, P53, etc.

The DVR 2500 and local storage 2502 may be connected to respective communication interfaces 2504, 2506 such as but not limited to telephone lines, for connection to, e.g., a computer system associated with a cable head end of an MSO. The DVR and local storage also may communicate through a wireless AP 2508 and thence to cloud storage 2510 on the Internet. Access to cloud storage may alternatively be provided by the MSO computer system through the interfaces 2504, 2506. Other devices such as a tablet computer 2512 or the AVDD 12 configured as a TV may also be provided for executing present principles.

In FIG. 25, either the local storage 2502 or cloud storage 2510 is used for expanding usable storage capacity for purposes of storing a backup disk image when replacing the DVR 2500 with another DVR, making it easy for a customer to move his content from an older DVR to a newer DVR, without losing their stored content or settings. The customer, by means of a UI on the tablet 2512 or DVR 2500 for example, can begin a transfer of content from the DVR to the local storage 2502 and/or the cloud storage 2510. As disclosed above, the MSO may authenticate the authorization for the DVR to transfer content.

A cable or satellite or telephone MSO may provide an interface on its network for this purpose, with which the tablet 2512 or DVR 2500 executing the transfer can communicate. Using a high-speed networking connection, such as Multimedia over Cox Alliance (MoCA) or Ethernet over Coax, or Gigabit Ethernet, can be used for optimal data transfer rates. DLNA CVP-2 may also be used for standardization since DLNA CVP-2 is currently being deployed as a way for customers to view their full, premium TV subscription content on multiple devices.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD Rom or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. A method comprising:
    receiving at least one customer selection of content; and
    based at least in part on the customer selection, executing a load balancing algorithm to move content from a first digital video recorder (DVR) to a second DVR, the method also comprising:
    exchanging content lists between the first and second DVRs and storage size of each content and/or storage size of each element of each piece of content to be recorded in the future;
    accessing, by the first and second DVRs, future recording instructions input to them, identifying at least one program to be recorded in the future;
    using an identity of the at least one program commanded to be recorded as entering argument to a data store to retrieve a size of the at least one program commanded to be recorded, and/or determining from internal storage how much storage space one or more previously recorded programs consumed to infer that the at least one program commanded to be recorded will consume a same amount of storage space, and/or accessing an electronic program guide (EPG) listing the at least one program commanded to be recorded to determine from a length of the program as indicated by the EPG and a format of the at least one program commanded to be recorded as indicated by the EPG how much space the at least one program commanded to be recorded will consume.

2. The method of claim 1, comprising:
    based at least in part on the customer selection, executing a load balancing algorithm to record on a predetermined one of the DVRs at least one future content at a future recording time.

3. The method of claim 1, wherein the customer selection of content exempts the content from load balancing.

4. The method of claim 1, wherein the customer selection of content requires the content to be subject to load balancing.

5. The method of claim 1, comprising providing a selector selectable to command that all content on the DVRs be balanced as part of a load balancing algorithm.

6. The method of claim 1, comprising:
    determining from internal storage how much storage space one or more previously recorded programs consumed to infer that the at least one program commanded to be recorded will consume a same amount of storage space.

7. The method of claim 1, comprising:
    using an identity of the at least one program commanded to be recorded as entering argument to a data store to retrieve a size of the at least one program commanded to be recorded.

8. The method of claim 1, comprising:
    accessing an EPG listing the at least one program commanded to be recorded to determine from a length of the program as indicated by the EPG and a format of the at least one program commanded to be recorded as indicated by the EPG how much space the at least one program commanded to be recorded will consume.

9. An apparatus, comprising:
at least one processor configured to record digital video; and
at least one computer storage that is not a transitory signal and that comprises instructions executable by the at least one processor for:
receiving at least one customer selection of content; and
based at least in part on the customer selection, executing a load balancing algorithm to move content from a first digital video recorder (DVR) to a second DVR, the method also comprising:
exchanging content lists between the first and second DVRs and storage size of each content and/or storage size of each element of each piece of content to be recorded in the future;
accessing, by the first and second DVRs, future recording instructions input to them, identifying at least one program to be recorded in the future;
using an identity of the at least one program commanded to be recorded as entering argument to a data store to retrieve a size of the at least one program commanded to be recorded, and/or determining from internal storage how much storage space one or more previously recorded programs consumed to infer that the at least one program commanded to be recorded will consume a same amount of storage space, and/or accessing an electronic program guide (EPG) listing the at least one program commanded to be recorded to determine from a length of the program as indicated by the EPG and a format of the at least one program commanded to be recorded as indicated by the EPG how much space the at least one program commanded to be recorded will consume.

10. The apparatus of claim 9, wherein the instructions are executable for:
based at least in part on the customer selection, executing a load balancing algorithm to record on a predetermined one of the DVRs at least one future content at a future recording time.

11. The apparatus of claim 9, wherein the customer selection of content exempts the content from load balancing.

12. The apparatus of claim 9, wherein the instructions are executable for:
providing a selector selectable to command that all content on the DVRs be balanced as part of a load balancing algorithm.

13. The apparatus of claim 9, wherein the instructions are executable for:
determining from internal storage how much storage space one or more previously recorded programs consumed to infer that the at least one program commanded to be recorded will consume a same amount of storage space.

14. The apparatus of claim 9, wherein the instructions are executable for:
using an identity of the at least one program commanded to be recorded as entering argument to a data store to retrieve a size of the at least one program commanded to be recorded.

15. The apparatus of claim 9, wherein the instructions are executable for:
accessing an EPG listing the at least one program commanded to be recorded to determine from a length of the program as indicated by the EPG and a format of the at least one program commanded to be recorded as indicated by the EPG how much space the at least one program commanded to be recorded will consume.

16. An article of manufacture, comprising:
at least one computer storage that is not a transitory signal and that comprises instructions executable by at least one processor for:
receiving at least one customer selection of content; and
based at least in part on the customer selection, executing a load balancing algorithm to move content from a first digital video recorder (DVR) to a second DVR, the method also comprising:
exchanging content lists between the first and second DVRs and storage size of each content and/or storage size of each element of each piece of content to be recorded in the future;
accessing, by the first and second DVRs, future recording instructions input to them, identifying at least one program to be recorded in the future;
using an identity of the at least one program commanded to be recorded as entering argument to a data store to retrieve a size of the at least one program commanded to be recorded, and/or determining from internal storage how much storage space one or more previously recorded programs consumed to infer that the at least one program commanded to be recorded will consume a same amount of storage space, and/or accessing an electronic program guide (EPG) listing the at least one program commanded to be recorded to determine from a length of the program as indicated by the EPG and a format of the at least one program commanded to be recorded as indicated by the EPG how much space the at least one program commanded to be recorded will consume.

17. The article of manufacture of claim 16, wherein the instructions are executable for:
providing a selector selectable to command that all content on the DVRs be balanced as part of a load balancing algorithm.

18. The article of manufacture of claim 16, wherein the instructions are executable for:
determining from internal storage how much storage space one or more previously recorded programs consumed to infer that the at least one program commanded to be recorded will consume a same amount of storage space.

19. The article of manufacture of claim 16, wherein the instructions are executable for:
using an identity of the at least one program commanded to be recorded as entering argument to a data store to retrieve a size of the at least one program commanded to be recorded.

20. The article of manufacture of claim 16, wherein the instructions are executable for:
accessing an EPG listing the at least one program commanded to be recorded to determine from a length of the program as indicated by the EPG and a format of the at least one program commanded to be recorded as indicated by the EPG how much space the at least one program commanded to be recorded will consume.

* * * * *